(12) United States Patent
Yoshii

(10) Patent No.: US 10,838,610 B2
(45) Date of Patent: Nov. 17, 2020

(54) GRAPHICAL USER INTERFACE CONTROL DEVICE AND METHOD FOR CONTROLLING GRAPHICAL USER INTERFACE

(71) Applicant: Mitsubishi Electric Corporation, Tokyo (JP)

(72) Inventor: Ryo Yoshii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/476,974

(22) PCT Filed: Feb. 6, 2017

(86) PCT No.: PCT/JP2017/004194
§ 371 (c)(1),
(2) Date: Jul. 10, 2019

(87) PCT Pub. No.: WO2018/142609
PCT Pub. Date: Aug. 9, 2018

(65) Prior Publication Data
US 2019/0354257 A1  Nov. 21, 2019

(51) Int. Cl.
*G06F 3/0485* (2013.01)
*G06F 3/041* (2006.01)
*G06F 3/0488* (2013.01)

(52) U.S. Cl.
CPC .......... *G06F 3/0485* (2013.01); *G06F 3/0412* (2013.01); *G06F 3/0488* (2013.01)

(58) Field of Classification Search
CPC ..... G06F 3/0485; G06F 3/0488; G06F 3/0412
See application file for complete search history.

(56) References Cited

U.S. PATENT DOCUMENTS

| | | | |
|---|---|---|---|
| 2005/0005294 A1 | 1/2005 | Kojo et al. | |
| 2008/0204402 A1 | 8/2008 | Hirata et al. | |
| 2011/0185308 A1 | 7/2011 | Machida | |
| 2013/0328827 A1 | 12/2013 | Fukushima et al. | |
| 2015/0261432 A1* | 9/2015 | Yamamoto | G06F 3/04847 715/771 |

(Continued)

FOREIGN PATENT DOCUMENTS

| | | |
|---|---|---|
| JP | 2005-27245 A | 1/2005 |
| JP | 2008-204402 A | 9/2008 |

(Continued)

OTHER PUBLICATIONS

International Search Report, issued in PCT/JP2017/004194, PCT/ISA/210, dated Mar. 28, 2017.

*Primary Examiner* — Muhammad N Edun
(74) *Attorney, Agent, or Firm* — Birch, Stewart, Kolasch & Birch, LLP.

(57) ABSTRACT

A control unit (12) sets one of a first operation mode, in which first operation is enabled and second operation is disabled, and a second operation mode, in which the first operation is disabled and the second operation is enabled, to an operation target area and executes processing corresponding to the first operation or the second operation depending on the operation mode. When third operation is executed on the operation target area, the control unit (12) switches the operation mode of the operation target area.

17 Claims, 15 Drawing Sheets

(56) References Cited

U.S. PATENT DOCUMENTS

2016/0179322 A1 6/2016 Nagata
2016/0357428 A1* 12/2016 Okumura ............ G06F 3/04886

FOREIGN PATENT DOCUMENTS

| JP | 2011-154555 A | 8/2011 |
| JP | 2013-257641 A | 12/2013 |
| JP | 2015-46009 A | 3/2015 |

* cited by examiner

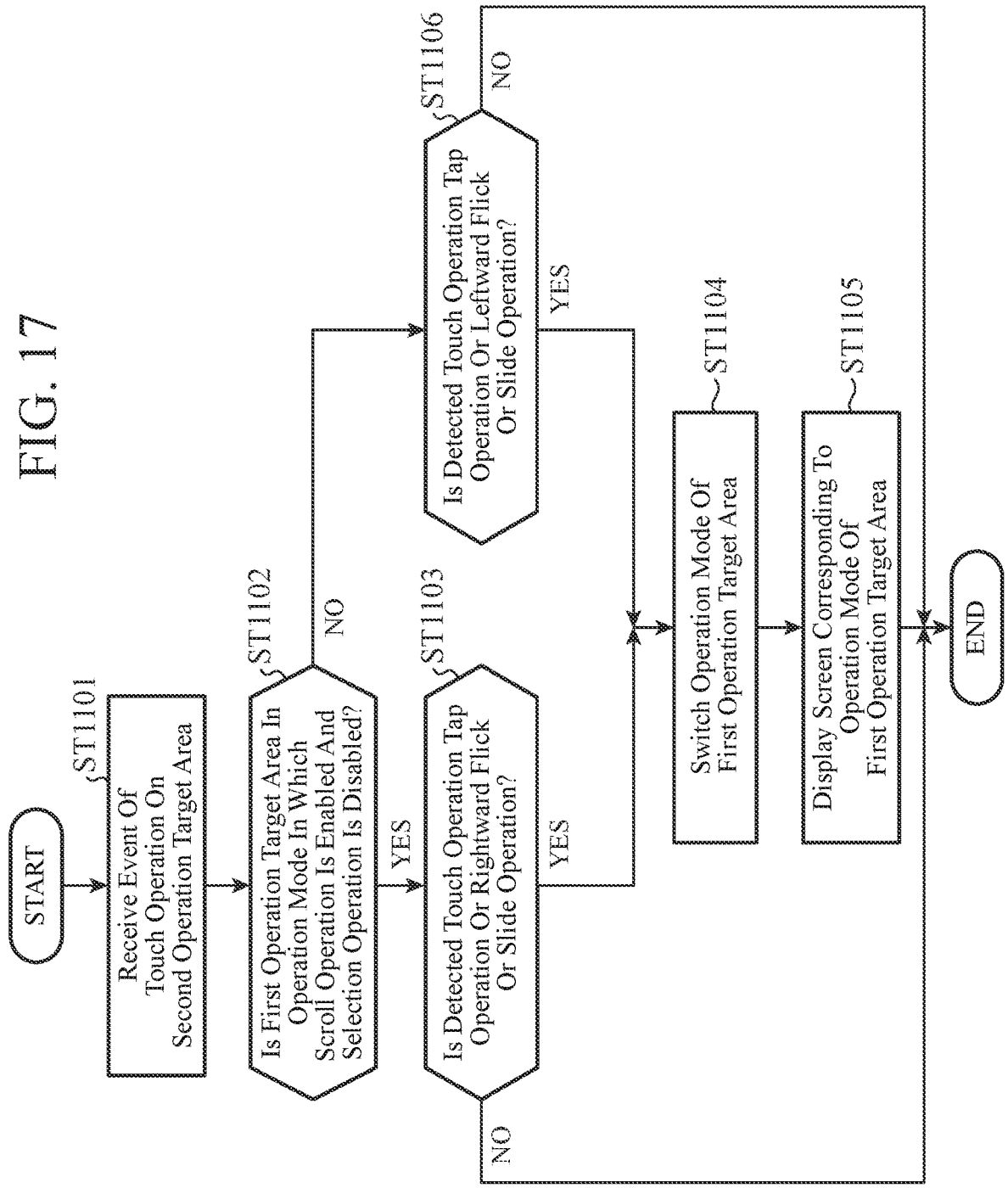

GRAPHICAL USER INTERFACE CONTROL DEVICE AND METHOD FOR CONTROLLING GRAPHICAL USER INTERFACE

TECHNICAL FIELD

The present invention relates to a graphical user interface (hereinafter referred to as GUI) control device for controlling a GUI related to an operation target area displayed on a screen and a method for controlling the GUI.

BACKGROUND ART

Electronic devices that accept operation on an operation target area displayed on a screen of a display device are widely used. In information terminals such as mobile phones and tablet PCs, a touch panel is arranged on the screen, and operation on the operation target area displayed on the screen is accepted as touch operation by the touch panel.

Touch operation includes, for example, flick operation, tap operation, and slide operation.

Flick operation is to flick or to sweep the screen in a scroll direction with a finger or the like. Tap operation is to touch the screen shortly with a finger. Slide operation is to move the finger touching the screen in a certain direction.

In the case where the movement amount of the finger sweeping the screen is small when the flick operation is performed in order to scroll the screen, there are cases where the touch panel accepts the touch operation not as the flick operation but as the tap operation. In this case, the screen is not scrolled, and processing corresponding to the tap operation is executed. In order to suppress such erroneous operation, for example, in an electronic device described in Patent Literature 1, tap operation is prohibited during scrolling, or tap operation is prohibited until a certain period of time passes after scrolling has stopped.

CITATION LIST

Patent Literature

Patent Literature 1: JP 2015-46009 A

SUMMARY OF INVENTION

Technical Problem

In the electronic device described in Patent Literature 1, tap operation is prohibited until a certain period of time passes after scrolling has stopped. For this reason, since tap operation is accepted after the certain period of time has passed, the erroneous operation as described above cannot be suppressed.

In a GUI in which a second operation target area is arranged inside a first operation target area and the first operation target area and the second operation target area can be separately scrolled, there are cases where an area different from an intended area is scrolled depending on the position where the flick operation for scrolling has been performed.

In the electronic device described in Patent Literature 1, such erroneous operation is not taken into consideration and cannot be suppressed.

Moreover, in a GUI in which the area occupied by the second operation target area inside the first operation target area is large, the portion for receiving the flick operation in the first operation target area is narrow. Therefore, operability for scrolling the first operation target area is not good enough, and erroneous operation is likely to occur.

The present invention solves the problems as the above, and an object of the present invention is to provide a GUI control device and a method for controlling a GUI that are capable of suppressing erroneous operation.

Solution to Problem

A GUI control device according to the present invention includes a display processing unit, an operation determination unit, and a control unit.

The display processing unit displays, on a screen, an operation target area in which processing corresponding to first operation and processing corresponding to second operation which is different from the first operation can be executed. The operation determination unit determines operation executed on the operation target area. The control unit sets one of a first operation mode, in which the first operation is enabled and the second operation is disabled, and a second operation mode, in which the first operation is disabled and the second operation is enabled, to the operation target area and executes processing corresponding to the first operation or the second operation depending on the set operation mode.

In this configuration, in the case where the operation determined by the operation determination unit is third operation that is different from the first operation and the second operation, the control unit switches the operation mode of the operation target area.

Advantageous Effects of Invention

According to this invention, either the first operation mode or the second operation mode is set to an operation target area, and processing corresponding to the first operation or the second operation is executed depending on the set operation mode. When the third operation is executed on the operation target area, the operation mode of the operation target area is switched. As a result, since the third operation allows the first operation and the second operation to be switched between enabled and disabled states, erroneous operation can be suppressed in which the first operation is erroneously recognized as the second operation, or the second operation erroneously recognized as the first operation.

BRIEF DESCRIPTION OF DRAWINGS

FIG. 17 is a flowchart illustrating processing corresponding to operation on a mode-switching area in the third embodiment.

DESCRIPTION OF EMBODIMENTS

To describe the present invention further in detail, embodiments for carrying out the invention will be described below along with the accompanying drawings.

First Embodiment

Figure 1:
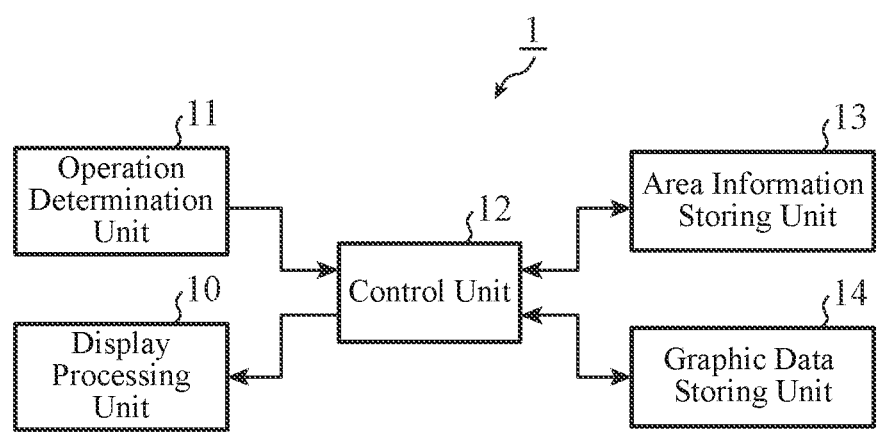
FIG. 1 is a block diagram illustrating a functional configuration of a GUI control device according to a first embodiment of the present invention.

FIG. 1 is a block diagram illustrating a functional configuration of a GUI control device 1 according to a first embodiment of the present invention. The GUI control device 1 is provided in an in-vehicle electronic device, for example, and controls the GUI between an operator and the in-vehicle electronic device.

The GUI control device 1 includes a display processing unit 10, an operation determination unit 11, a control unit 12, an area information storing unit 13, and a graphic data storing unit 14.

The display processing unit 10 displays an image based on graphic data received from the control unit 12 on a screen of a display device. For example, the display processing unit 10 displays, on the screen, an operation target area in which processing corresponding to first operation and processing corresponding to second operation can be executed.

In the following description, it is assumed that a touch panel is provided on the screen of the display device and that this touch panel accepts touch operation on an operation target area.

The first operation is flick operation or slide operation to which processing of scrolling an operation target area is assigned. It is assumed that the second operation is operation different from the first operation and is tap operation to which processing of selecting an object in an operation target area is assigned.

The operation determination unit 11 determines operation executed on an operation target area. For example, the operation determination unit 11 determines the operation executed on the operation target area on the basis of event information of the touch operation on the operation target area. The operation determination unit 11 determines the type of touch operation, the operation position, or an object to be operated. The types of touch operation include flick operation, tap operation, and slide operation.

The control unit 12 sets one of the first operation mode and the second operation mode on the operation target area and executes processing corresponding to the first operation or the second operation depending on the operation mode.

In the first operation mode, the first operation is enabled, whereas the second operation is disabled, and in the second operation mode the first operation is disabled, whereas the second operation is enabled.

"Disabled" means that even when operation is executed, processing corresponding to this operation is not executed, and "enabled" means that when operation is executed, processing corresponding to this operation is executed.

When the first operation is executed on an operation target area in which the first operation mode is set, the control unit 12 executes processing of scrolling the operation target area since the first operation is "enabled."

Moreover, when the second operation is executed on the operation target area, the control unit 12 does not execute processing corresponding to selection of an object since the second operation is "disabled."

When the first operation is executed on an operation target area in which the second operation mode is set, the control unit 12 does not execute processing of scrolling the operation target area since the first operation is "disabled."

Moreover, in the case where operation executed on the operation target area is the second operation, the control unit 12 executes processing corresponding to selection of an object since the second operation is "enabled."

Furthermore, in the case where operation determined by the operation determination unit 11 is the third operation, the control unit 12 switches the operation mode of the operation target area.

In the case where the first operation mode is set to the operation target area, the operation mode is switched to the second operation mode. In the case where the second operation mode is set to the operation target area, the operation mode is switched to the first operation mode.

The third operation is different from the first operation and the second operation. The third operation is, for example, slide operation in which an angle formed by the operation direction with respect to a direction in which the operation target area can be scrolled is equal to or more than a threshold value.

The area information storing unit 13 stores area information related to operation target areas. Information related to an operation target area includes operation mode set to the operation target area.

The graphic data storing unit 14 stores graphic data of operation target areas. Graphic data of an operation target area also includes graphic data of an operation target area to be transitioned to upon selection of an object in the operation target area.

The control unit 12 receives discrimination information of touch operation from the operation determination unit 11, reads an operation mode of the operation target area from the area information storing unit 13, and executes processing corresponding to operation executed on the operation target area depending on this operation mode.

When the third operation is executed on the operation target area, the control unit 12 switches and updates the operation mode in the area information of the operation target area stored in the area information storing unit 13.

The control unit 12 requests graphic data corresponding to the operation to the graphic data storing unit 14, reads the graphic data corresponding to the request, and sends the data to the display processing unit 10.

The display processing unit 10 displays an operation target area on the screen on the basis of the graphic data received from the control unit 12.

In FIG. 1, the GUI control device 1 including the area information storing unit 13 and the graphic data storing unit 14 is illustrated; however, no limitation thereto is intended.

For example, as long as storage devices enable reading and updating of the area information as well as requesting and reading the graphic data by the control unit 12, the storage devices may be provided separately from the GUI control device 1. That is, the area information storing unit 13 and the graphic data storing unit 14 are not indispensable components to the GUI control device 1.

Figure 2A:
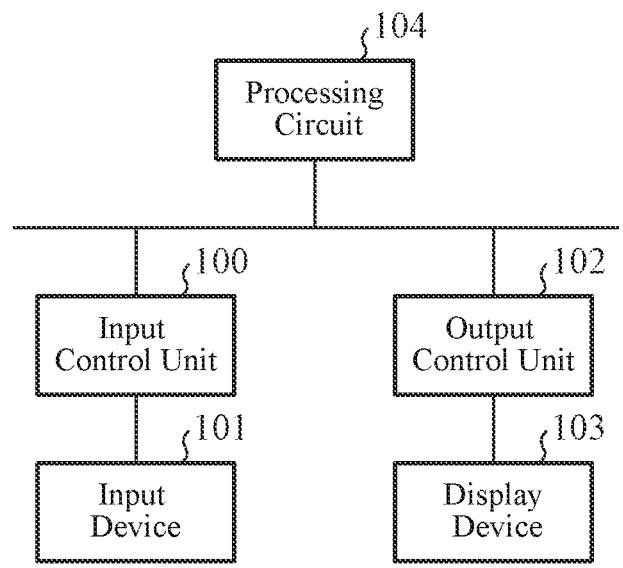
FIG. 2A is a block diagram illustrating a hardware configuration of an electronic device according to the first embodiment.
Figure 2B:
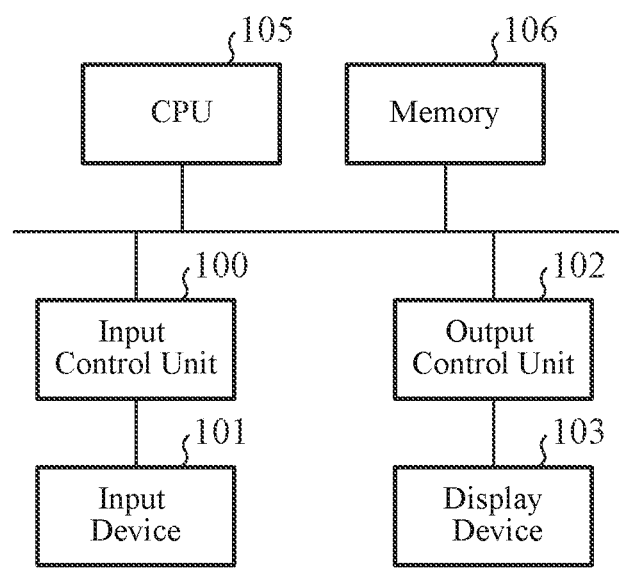
FIG. 2B is a block diagram illustrating a hardware configuration for executing software that implements functions of the electronic device according to the first embodiment.

FIG. 2A is a block diagram illustrating a hardware configuration of the electronic device according to the first embodiment and illustrates an electronic device including the GUI control device 1. FIG. 2B is a block diagram illustrating a hardware configuration for executing software implementing the functions of the electronic device according to the first embodiment and, likewise, illustrating an electronic device including the GUI control device 1.

As illustrated in FIGS. 2A and 2B, the electronic device includes an input control unit 100, an input device 101, an output control unit 102, and a display device 103.

The input control unit 100 generates event information of operation from detection information of the operation detected by the input device 101. The event information of touch operation is a signal indicating the contents of the touch operation including the area touched and the type of the touch operation.

The input device 101 accepts operation by an operator and is implemented by a touch panel. The operation determination unit 11 receives event information from the input control unit 100 and determines the operation executed on the operation target area via the input device 101 which is a touch panel from the operation contents indicated by the event information.

The output control unit 102 displays display information on the screen of the display device 103. The display device 103 is a display monitor included in the electronic device.

The display processing unit 10 generates display information of the operation target area on the basis of the graphic data received from the control unit 12 and outputs the display information to the output control unit 102.

The output control unit 102 displays the operation target area on the screen of the display device 103 on the basis of the display information input from the display processing unit 10.

The functions of the display processing unit 10, the operation determination unit 11, the control unit 12, the area information storing unit 13, and the graphic data storing unit 14 in the GUI control device 1 are implemented by a processing circuit. That is, the GUI control device 1 includes a processing circuit for executing these functions. The processing circuit may be dedicated hardware or a central processing unit (CPU) for executing a program stored in a memory.

In the case where the processing circuit is a processing circuit 104 of dedicated hardware as illustrated in FIG. 2A, the processing circuit 104 may be a single circuit, a composite circuit, a programmed processor, a parallel programmed processor, an application specific integrated circuit (ASIC), a field-programmable gate array (FPGA), or a combination thereof.

The functions of the display processing unit 10, the operation determination unit 11, the control unit 12, the area information storing unit 13, and the graphic data storing unit 14 in the GUI control device 1 may be implemented by separate processing circuits, or the respective functions may be implemented collectively by a single processing circuit.

In the case where the processing circuit is a CPU 105 illustrated in FIG. 2B, the functions of the display processing unit 10, the operation determination unit 11, the control unit 12, the area information storing unit 13, and the graphic data storing unit 14 are implemented by software, firmware, or a combination of software and firmware. Software and firmware are described as a program and stored in a memory 106.

The memory 106 may include a random access memory (RAM) and a read only memory (ROM). In this case, the RAM stores data generated by information processing such as screen data displayed on the display device 103 and control data necessary for execution of the program, and the ROM stores the program to be executed by the CPU 105.

The CPU 105 reads and executes the program stored in the memory 106 and thereby implements the respective functions.

Figure 3:
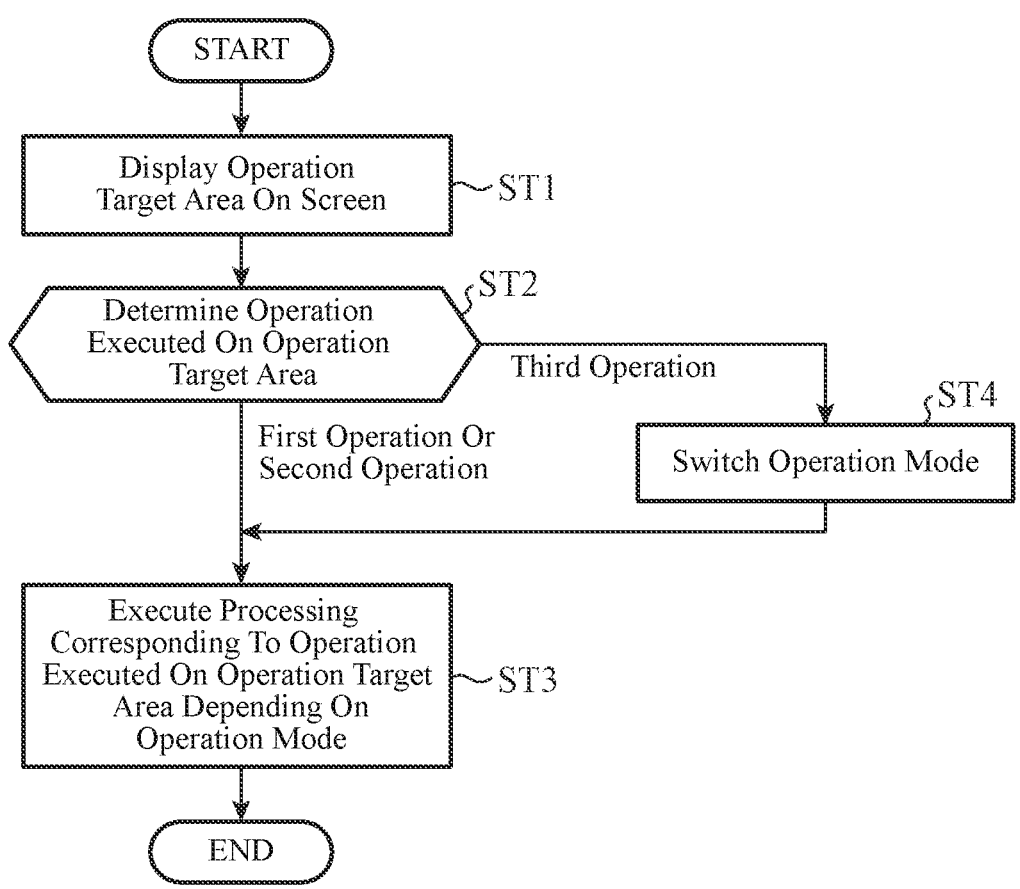
FIG. 3 is a flowchart illustrating an overview of the operation of the GUI control device according to the first embodiment.

That is, the GUI control device 1 includes the memory for storing the program, upon executed by the processing circuit, which results in execution of processing from step ST1 to step ST4 illustrated in FIG. 3. In addition, such programs cause a computer to execute the procedures or methods of the display processing unit 10, the operation determination unit 11, the control unit 12, the area information storing unit 13, and the graphic data storing unit 14.

In this example, the memory may include a nonvolatile or volatile semiconductor memory such as a RAM, a ROM, a flash memory, an erasable programmable ROM (EPROM), or an electrically EPROM (EEPROM); a magnetic disc, a flexible disc, an optical disc, a compact disc, a mini disc, or a digital versatile disk (DVD).

Some of the functions of the display processing unit 10, the operation determination unit 11, the control unit 12, the area information storing unit 13, and the graphic data storing unit 14 may be implemented by dedicated hardware and a rest thereof may be implemented by software or firmware. For example, the area information storing unit 13 and the graphic data storing unit 14 implement functions thereof by a processing circuit of dedicated hardware, and functions of the display processing unit 10, the operation determination unit 11, and the control unit 12 are implemented by the CPU 105 executing the program stored in the memory 106.

In this manner, the processing circuit can implement the functions described above by hardware, software, firmware, or a combination thereof.

FIG. 3 is a flowchart illustrating the outline of the operation of the GUI control device 1, and illustrates a series of processing from the time when an operation target area is displayed on the screen to the time when processing corresponding to operation is executed.

First, the display processing unit 10 displays an operation target area on the screen of the display device 103 on the basis of graphic data received from the control unit 12 (step ST1).

Next, the operation determination unit 11 determines operation executed on the operation target area displayed on the screen (step ST2).

If the operation executed on the operation target area is either the first operation or the second operation (step ST2: first operation or second operation), the control unit 12 executes processing corresponding to the first operation or the second operation depending on an operation mode (step ST3).

For example, if the first operation is executed on an operation target area in which the first operation mode is set, the control unit 12 executes processing of scrolling the operation target area.

The control unit 12 does not execute processing corresponding to selection of an object even when the second operation is executed on the operation target area.

Moreover, in an operation target area in which the second operation mode is set, the control unit 12 does not execute processing of scrolling the operation target area even when the first operation is executed on the operation target area.

When the second operation is executed on the operation target area, the control unit 12 executes processing corresponding to selection of an object.

If the operation executed in the operation target area is the third operation (step ST2: third operation), the control unit 12 switches the operation mode of the operation target area (step ST4).

For example, the control unit 12 switches and updates the operation mode in the area information of the operation target area stored in the area information storing unit 13. As a result, in the case where the first operation mode is set to the operation target area, the operation mode is switched to the second operation mode. In the case where the second operation mode is set to the operation target area, the operation mode is switched to the first operation mode.

Then, the flow proceeds to processing in step ST3, and the processing is executed.

Next, GUI screens in the first embodiment will be described with specific examples.

Figure 4A:
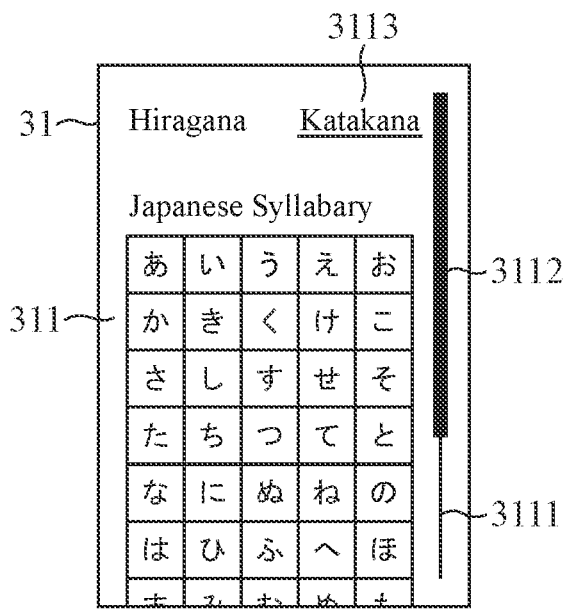
FIG. 4A is a diagram illustrating a first example of a GUI screen according to the first embodiment.
Figure 4B:
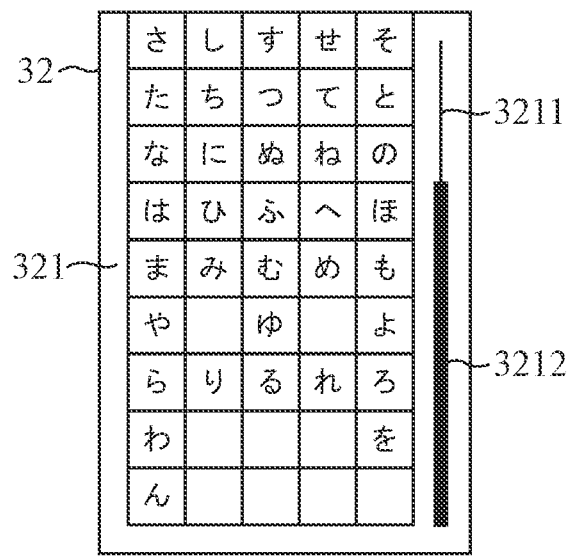
FIG. 4B is a diagram illustrating a second example of a GUI screen according to the first embodiment.
Figure 4C:
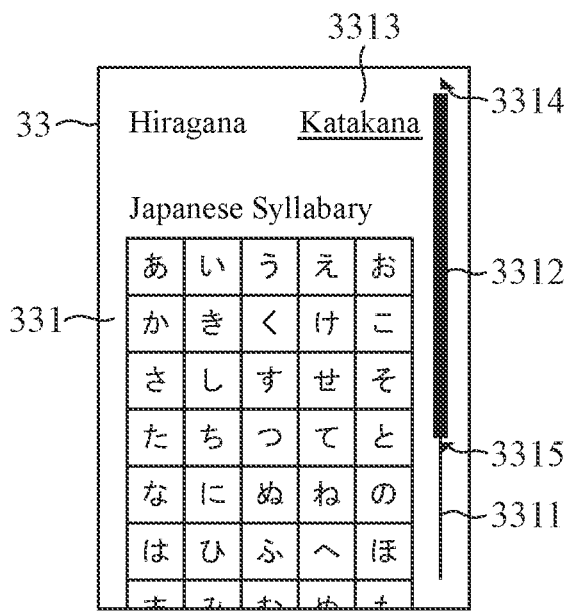
FIG. 4C is a diagram illustrating a third example of a GUI screen according to the first embodiment.
Figure 4D:
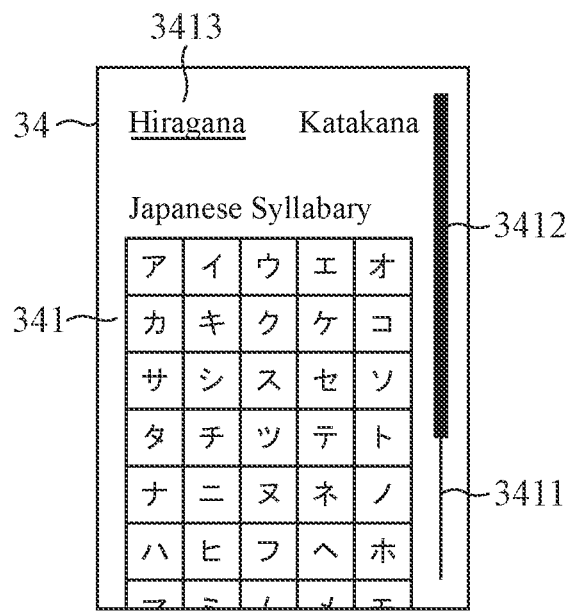
FIG. 4D is a diagram illustrating a fourth example of a GUI screen according to the first embodiment.

FIGS. 4A to 4D are diagrams illustrating specific examples of a GUI screen according to the first embodiment. FIG. 4A is a diagram illustrating a GUI screen 31. FIG. 4B is a diagram illustrating a GUI screen 32. FIG. 4C is a diagram illustrating a GUI screen 33. FIG. 4D is a diagram illustrating a GUI screen 34.

An area 311 illustrated in FIG. 4A, an area 321 illustrated in FIG. 4B, an area 331 illustrated in FIG. 4C, and an area 341 illustrated in FIG. 4D are operation target areas which can be scrolled only in the vertical direction.

In the area 311, the area 321, and the area 341, a first operation mode in which operation corresponding to scroll processing is enabled and operation corresponding to selection of an object is disabled is set.

In the area 331, a second operation mode in which operation corresponding to scroll processing is disabled and operation corresponding to selection of an object is enabled is set.

A bar 3111 illustrated in FIG. 4A, a bar 3211 illustrated in FIG. 4B, a bar 3311 illustrated in FIG. 4C, and a bar 3411 illustrated in FIG. 4D indicate that the area 311, the area 321, the area 331, and the area 341 can be scrolled in the vertical direction. The lengths of the bars 3111, 3211, 3311, and 3411 correspond to the amount of information that can be viewed in the areas 311, 321, 331, and 341, respectively.

A bar 3112 illustrated in FIG. 4A, a bar 3212 illustrated in FIG. 4B, a bar 3312 illustrated in FIG. 4C, and a bar 3412 illustrated in FIG. 4D indicate the positions in the vertical direction of the information currently displayed on the screen, out of information that can be viewed in the area 311, the area 321, the area 331, and the area 341, respectively. For example, since the bar 3112 is in contact with the uppermost position of the bar 3111, the information currently displayed on the screen is information at the scrollable upper limit position of the area 311.

Note that the lengths of the bars 3112, 3212, 3312, and 3412 correspond to the amount of information currently displayed on the screen.

A text 3113 illustrated in FIG. 4A, a text 3313 illustrated in FIG. 4C, and a text 3413 illustrated in FIG. 4D are text items each set with a hyperlink. These text items are objects that can be selected by tap operation.

Marks 3314 and 3315 illustrated in FIG. 4C are images indicating that the second operation mode, in which scroll processing is disabled, is set in the area 331. An operator can recognize from the marks 3314 and 3315 that the area 331 cannot be scrolled.

In this manner, an operation target area is displayed on the screen in a display mode specified for each operation mode.

This allows the operator to recognize the operation mode from the display mode of the operation target area.

In FIGS. 4A to 4D, a direction oriented upward in the drawings along a linear line forming an angle of less than 45 degrees with respect to a scrollable direction in the areas 311, 321, 331, and 341, respectively, is defined as an upward direction, and a direction oriented downward in the drawings along the linear line is defined as a downward direction.

A direction oriented leftward in the drawings along a linear line forming an angle of equal to or greater than 45 degrees with respect to the scrollable direction in the areas 311, 321, 331, and 341 is defined as a leftward direction, and a direction oriented rightward in the drawings along the linear line is defined as a rightward direction.

Note that when the upward direction or the downward direction is rephrased as the vertical direction and the leftward direction or the rightward direction is rephrased as the horizontal direction, the operator can perform flick operation or slide operation in the vertical direction and the horizontal direction in each of the areas 311, 321, 331, and 341.

Next, operation on the GUI screens will be described.

On the GUI screen 31, in the case where operation determined by the operation determination unit 11 in the area 311 is tap operation (second operation) of the text 3113, since the first operation mode is set in the area 311, the control unit 12 does not execute processing corresponding to the selection of the text 3113. As a result, the display on the GUI screen 31 remains unchanged.

In the case where operation determined by the operation determination unit 11 in the area 311 is upward flick operation or slide operation (first operation), since the first operation mode is set in the area 311, the control unit 12 executes scrolling of the area 311. Under the control by the display processing unit 10, the display device 103 displays the GUI screen 32 which is the result of scrolling the area 311.

In the case where operation determined by the operation determination unit 11 in the area 311 is slide operation (third operation) in the horizontal direction, the control unit 12 switches the operation mode of the area 311 to the second operation mode. Under the control by the display processing unit 10, the display device 103 displays the GUI screen 33 in which the marks 3314 and 3315 are drawn.

On the GUI screen 32, in the case where operation determined by the operation determination unit 11 in the area 321 is downward flick operation or slide operation (first operation), since the first operation mode is set in the area 321, the control unit 12 executes scrolling of the area 321. Under the control by the display processing unit 10, the display device 103 displays the GUI screen 31 which is the result of scrolling the area 321.

In the case where operation determined by the operation determination unit 11 in the area 321 is slide operation (third operation) in the horizontal direction, the control unit 12 switches the operation mode of the area 321 to the second operation mode.

Under the control by the display processing unit 10, the display device 103 displays a GUI screen on which marks indicating that scrolling cannot be executed are drawn. This GUI screen is not illustrated.

On the GUI screen 33, in the case where operation determined by the operation determination unit 11 in the area 331 is tap operation (second operation) of the text 3313, since the second operation mode is set in the area 331, the control unit 12 executes processing corresponding to the selection of the text 3313.

The display device 103 displays the GUI screen 34 corresponding to the selection of the text 3313 under the control by the display processing unit 10.

In the case where operation determined by the operation determination unit 11 in the area 331 is upward flick operation or slide operation (first operation), since the second operation mode is set in the area 331, the control unit 12 does not execute scrolling of the area 331. As a result, the display on the GUI screen 33 remains unchanged.

In the case where operation determined by the operation determination unit 11 in the area 331 is slide operation (third operation) in the horizontal direction, the control unit 12 switches the operation mode of the area 331 to the first operation mode.

Under the control by the display processing unit 10 instructed by the control unit 12, the display device 103 hides the marks 3314 and 3315 and displays the GUI screen 31.

On the GUI screen 34, in the case where operation determined by the operation determination unit 11 in the area 341 is tap operation (second operation) of the text 3413, since the first operation mode is set in the area 341, the control unit 12 does not execute processing corresponding to the selection of the text 3413. As a result, the display on the GUI screen 34 remains unchanged.

In the case where operation determined by the operation determination unit 11 in the area 341 is upward flick operation or slide operation (first operation), since the first operation mode is set in the area 341, the control unit 12 executes scrolling of the area 341.

Under the control by the display processing unit 10, the display device 103 displays a GUI screen which is the result of scrolling the area 341. This GUI screen is not illustrated.

In the case where operation determined by the operation determination unit 11 in the area 341 is slide operation (third operation) in the horizontal direction, the control unit 12 switches the operation mode of the area 341 to the second operation mode. Under the control by the display processing unit 10 instructed by the control unit 12, the display device 103 displays a GUI screen in which the marks 3314 and 3315 are displayed. This GUI screen is not illustrated.

Next, details of the operation will be described.

Figure 5:
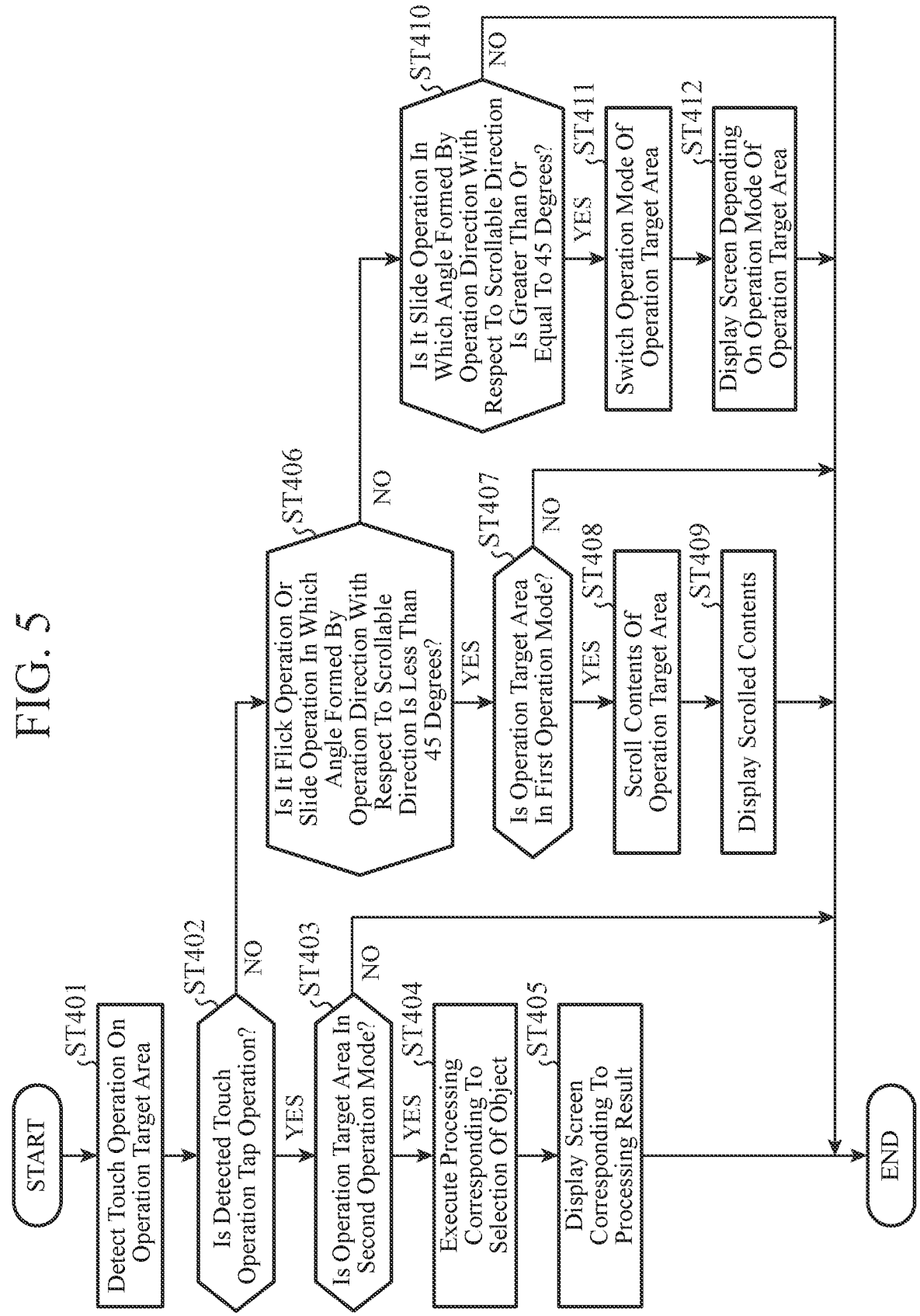
FIG. 5 is a flowchart illustrating details of the operation of the GUI control device according to the first embodiment.

FIG. 5 is a flowchart illustrating details of the operation of the GUI control device 1, and illustrates details of processing from the time when an operation target area is displayed on the screen to the time when processing corresponding to operation is executed.

When touch operation on the operation target area is detected (step ST401), the operation determination unit 11 determines whether the detected touch operation is tap operation (step ST402).

If it is determined that the touch operation is tap operation (step ST402; YES), the control unit 12 confirms whether the second operation mode is set to the operation target area (step ST403). The second operation mode is an operation mode in which scroll operation is disabled and the object selection operation is enabled.

If the second operation mode is set to the operation target area (step ST403; YES), the control unit 12 executes processing corresponding to selection of an object by tap operation (step ST404). According to an instruction from the control unit 12, the display processing unit 10 displays a screen based on the execution result of the processing on the display device 103 (step ST405). If the second operation mode is not set to the operation target area (step ST403; NO), the control unit 12 terminates the processing without any further action.

On the other hand, if the touch operation is not tap operation (step ST402; NO), the operation determination unit 11 determines whether the touch operation is flick operation or slide operation in which the angle formed by the operation direction with respect to the scrollable direction in the operation target area is less than 45 degrees (step ST406).

If it is determined as flick operation or slide operation in which the angle is less than 45 degrees (step ST406; YES), the control unit 12 confirms whether the first operation mode is set to the operation target area (step ST407). The first operation mode is an operation mode in which scroll operation is enabled and object selection operation is disabled.

If the first operation mode is set to the operation target area (step ST407; YES), the control unit 12 executes processing of scrolling the operation target area (step ST408). In accordance with an instruction from the control unit 12, the display processing unit 10 displays a screen obtained by scrolling the operation target area on the display device 103 (step ST409). Then, the processing is terminated. If the first operation mode is not set to the operation target area (step ST407; NO), the processing is terminated.

If it is not determined as flick operation nor slide operation in which the angle is less than 45 degrees (step ST406; NO), the operation determination unit 11 determines whether it is slide operation in which the angle is equal to or greater than 45 degrees (step ST410). If it is determined as not being slide operation in which the angle is equal to or greater than 45 degrees (step ST410; NO), the processing is terminated.

If it is determined as slide operation in which the angle is equal to or greater than 45 degrees (step ST410; YES), the control unit 12 determines that the third operation has been executed and switches the operation mode of the operation target area (step ST411).

In accordance with an instruction from the control unit 12, the display processing unit 10 displays a screen corresponding to the operation mode after switching on the display device 103 (step ST412). Then, the processing is terminated.

Note that, in the case where operation determined by the operation determination unit 11 in the operation target area in which the second operation mode is set is the second operation, the control unit 12 may execute processing corresponding to selection of an object and may further switch the operation target area to the first operation mode.

Normally, when an operator selects an object to display a new operation target area on the screen, the operator views information of this operation target area. In this case, when scroll processing of the operation target area is disabled, it is difficult to view the information.

Therefore, by causing the control unit 12 to execute processing corresponding to selection of an object and then to switch the operation target area to the first operation mode, a newly displayed operation target area becomes scrollable, thereby facilitating viewing of the information.

As described above, in the GUI control device 1 according to the first embodiment, the control unit 12 sets one of the first operation mode and the second operation mode to the operation target area, and executes processing corresponding to the first operation or the second operation depending on the set operation mode. When the third operation is executed on the operation target area, the control unit 12 switches the operation mode of the operation target area.

The first operation is touch operation for scrolling the operation target area, and in particular, flick operation or slide operation in which the angle formed by an operation direction with respect to a scrollable direction in the operation target area is less than a threshold value. The second operation is touch operation for selecting an object in the operation target area. The third operation is different from the first operation and the second operation. The third operation is, for example, slide operation in which the angle formed by the operation direction with respect to a direction in which the operation target area can be scrolled is equal to or more than the threshold value.

Since the third operation allows the first operation and the second operation to be switched between enabled and disabled states, erroneous operation can be suppressed in which the first operation is erroneously recognized as the second operation, or the second operation erroneously recognized as the first operation.

For example in the GUI screen 31 illustrated in FIG. 4A, even when the text 3113 is erroneously tapped when flick operation is attempted with an intention to scroll the area 311, processing corresponding to the tap operation is disabled in the area 311. As a result, the tap operation is not accepted, and no erroneous operation occurs.

Second Embodiment

Figure 6:
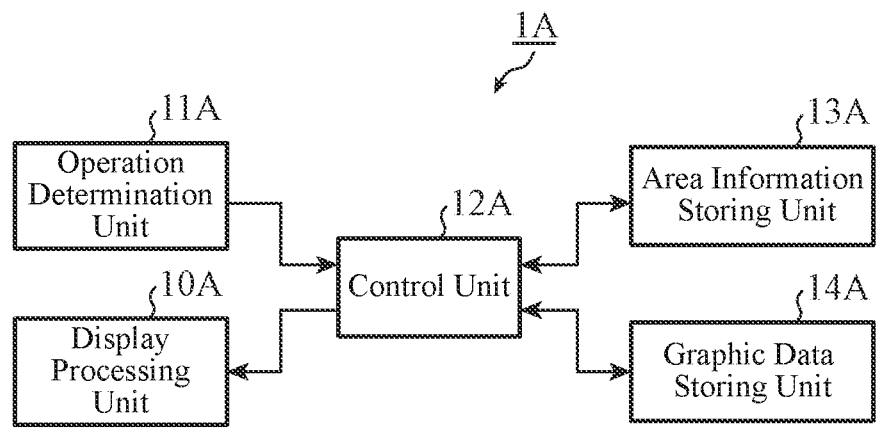
FIG. 6 is a block diagram illustrating a functional configuration of a GUI control device according to a second embodiment of the present invention.

FIG. 6 is a block diagram illustrating a functional configuration of a GUI control device 1A according to a second embodiment of the present invention. The GUI control device 1A is provided in an in-vehicle electronic device, for example, and controls the GUI between an operator and the in-vehicle electronic device.

The GUI control device 1A includes a display processing unit 10A, an operation determination unit 11A, a control unit 12A, an area information storing unit 13A, and a graphic data storing unit 14A.

The display processing unit 10A displays the image based on graphic data received from the control unit 12A on the screen of the display device 103 illustrated in FIGS. 2A and 2B.

For example, the display processing unit 10A displays each of a plurality of operation target areas, on which processing corresponding to the first operation and processing corresponding to the second operation can be executed, on the screen in alignment. Alternatively, the display processing unit 10A displays each of the plurality of operation target areas such that an inner area is arranged within an outer area on the screen.

In the following description, it is assumed that a touch panel is provided on the screen of the display device 103 and that this touch panel accepts touch operation on an operation target area.

The first operation is flick operation or slide operation to which processing of scrolling an operation target area is assigned. It is assumed that the second operation is operation different from the first operation and is tap operation to which processing of selecting an object in an operation target area is assigned.

The operation determination unit 11A determines operation executed on each of the plurality of operation target areas.

For example, the operation determination unit 11A determines operation executed on the operation target areas on the basis of an input control signal corresponding to touch operation on each of the plurality of operation target areas.

The control unit 12A sets one of the first operation mode and the second operation mode to each of the plurality of operation target areas and executes processing corresponding to the first operation or the second operation depending on the operation mode.

For example, when the first operation is executed on an operation target area in which the first operation mode is set, the control unit 12A executes processing of scrolling the operation target area since the first operation is "enabled." Even when the second operation is executed on this operation target area, since the second operation is "disabled," the control unit 12A does not execute processing corresponding to the selection of an object.

On the other hand, when the first operation is executed on an operation target area in which the second operation mode is set, the control unit 12A does not execute processing of scrolling the operation target area since the first operation is "disabled." However, when the second operation is executed on this operation target area, the control unit 12A executes processing corresponding to the selection of an object since the second operation is "enabled."

Furthermore, the control unit 12A switches the operation mode of an operation target area in which operation determined by the operation determination unit 11A is the third operation from among the plurality of operation target areas.

In the case where the first operation mode is set to the operation target area, the operation mode is switched to the second operation mode. In the case where the second operation mode is set to the operation target area, the operation mode is switched to the first operation mode.

The third operation is different from the first operation and the second operation. The third operation is, for example, slide operation in which an angle formed by the operation direction with respect to a direction in which the operation target area can be scrolled is equal to or more than a threshold value.

The area information storing unit 13A stores area information related to operation target areas.

Information related to operation target areas includes operation modes set to each of the plurality of operation target areas.

The graphic data storing unit 14A stores graphic data of the plurality of operation target areas. Each piece of the graphic data of the plurality of operation target areas also includes graphic data of an operation target area to be transitioned to upon selection of an object in an operation target area. The graphic data also includes information indicating a positional relationship and an inclusion relation among the operation target areas.

The control unit 12A receives discrimination information of touch operation from the operation determination unit 11A, reads an operation mode of an operation target area from the area information storing unit 13A, and executes processing corresponding to operation executed on the operation target area depending on the operation mode.

When the third operation is executed on the operation target area, the control unit 12A switches and updates the operation mode in the area information of the operation target area stored in the area information storing unit 13A.

The control unit 12A requests graphic data corresponding to the executed operation to the graphic data storing unit 14A, reads the graphic data corresponding to the request, and sends the data to the display processing unit 10A. The display processing unit 10A displays an operation target area on the screen on the basis of the graphic data received from the control unit 12A.

In FIG. 6, the GUI control device 1A including the area information storing unit 13A and the graphic data storing unit 14A is illustrated; however, no limitation thereto is intended.

For example, as long as storage devices enable reading and updating of the area information as well as requesting and reading of the graphic data by the control unit 12A, the storage devices may be provided separately from the GUI control device 1A. That is, the area information storing unit 13A and the graphic data storing unit 14A are not indispensable components to the GUI control device 1A.

The functions of the display processing unit 10A, the operation determination unit 11A, the control unit 12A, the area information storing unit 13A, and the graphic data storing unit 14A in the GUI control device 1A are implemented by a processing circuit. That is, the GUI control device 1A includes a processing circuit for executing these functions. The processing circuit may be dedicated hardware or a CPU that executes a program stored in a memory.

In the case where the processing circuit is the processing circuit 104 of dedicated hardware illustrated in FIG. 2A, the processing circuit 104 corresponds to, for example, a single circuit, a composite circuit, a programmed processor, a parallel programmed processor, an ASIC, an FPGA, or a combination thereof.

The functions of the display processing unit 10A, the operation determination unit 11A, the control unit 12A, the area information storing unit 13A, and the graphic data storing unit 14A in the GUI control device 1A may be implemented by separate processing circuits, or the respective functions may be implemented collectively by a single processing circuit.

In the case where the processing circuit is the CPU 105 illustrated in FIG. 2B, the functions of the display processing unit 10A, the operation determination unit 11A, the control unit 12A, the area information storing unit 13A, and the graphic data storing unit 14A are implemented by software, firmware, or a combination of software and firmware. Software and firmware are described as a program and stored in a memory 106. The memory 106 may include a RAM and a ROM. In this case, the RAM stores screen data displayed on the display device 103 and data generated by information processing such as control data necessary for execution of the program, and the ROM stores the program to be executed by the CPU 105.

The CPU 105 reads and executes the program stored in the memory 106 and thereby implements the respective functions.

Figure 7:
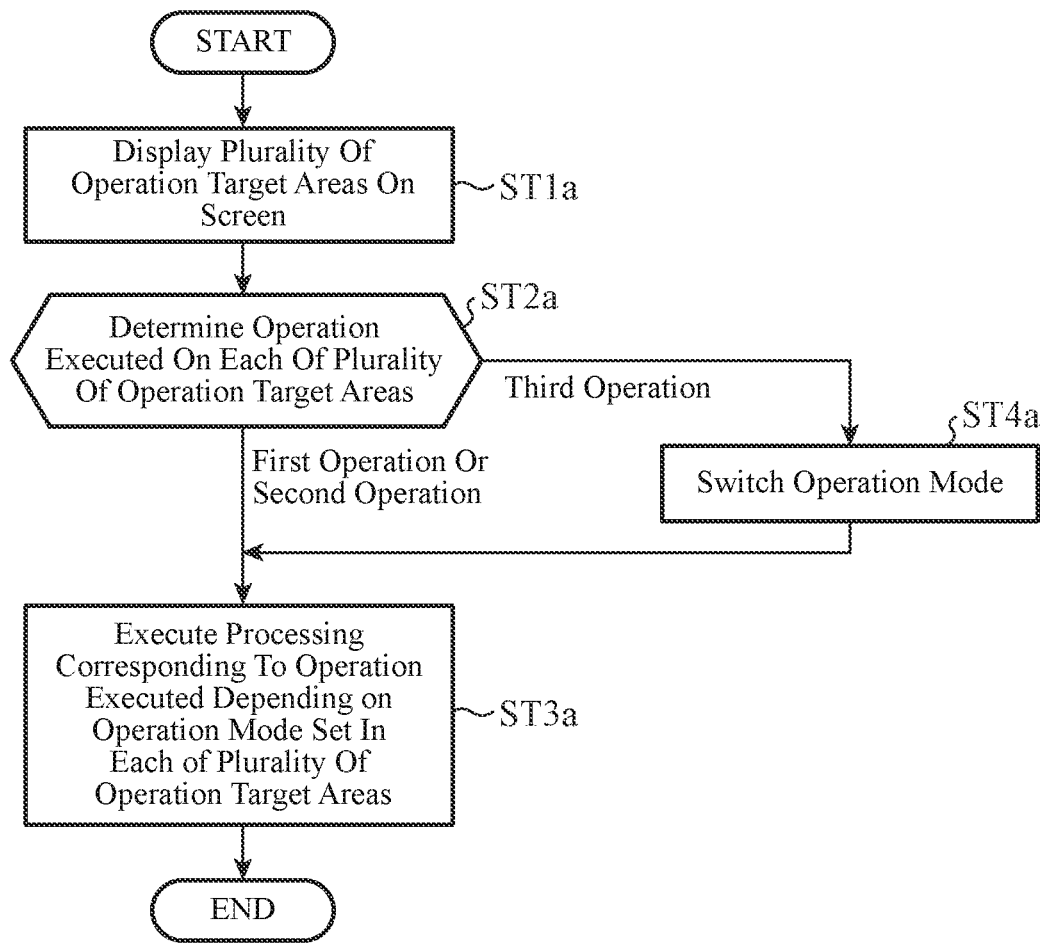
FIG. 7 is a flowchart illustrating an overview of the operation of the GUI control device according to the second embodiment.

That is, the GUI control device 1A includes the memory for storing the program, upon executed by the processing circuit, which results in execution of processing from step ST1a to step ST4a illustrated in FIG. 7. In addition, such programs cause a computer to execute the procedures or methods of the display processing unit 10A, the operation determination unit 11A, the control unit 12A, the area information storing unit 13A, and the graphic data storing unit 14A.

Some of the functions of the display processing unit 10A, the operation determination unit 11A, the control unit 12A, the area information storing unit 13A, and the graphic data storing unit 14A may be implemented by dedicated hardware and a rest thereof may be implemented by software or firmware.

For example, the area information storing unit 13A and the graphic data storing unit 14A implement functions thereof by a processing circuit of dedicated hardware, and functions of the display processing unit 10A, the operation determination unit 11A, and the control unit 12A are implemented by the CPU 105 executing the program stored in the memory 106.

In this manner, the processing circuit can implement the functions described above by hardware, software, firmware, or a combination thereof.

FIG. 7 is a flowchart illustrating the outline of the operation of the GUI control device 1A, and illustrates a series of processing from the time when an operation target area is displayed on the screen to the time when processing corresponding to operation is executed.

First, the display processing unit 10A displays a plurality of operation target areas on the screen of the display device 103 on the basis of graphic data received from the control unit 12A (step ST1a).

Next, the operation determination unit 11A determines operation executed on each of the plurality of operation target areas displayed on the screen (step ST2a).

If the executed operation is the first operation or the second operation (step ST2a: first operation or second operation), the control unit 12A executes processing corresponding to the first operation or the second operation depending on an operation mode of the operation target area on which this operation is executed among the plurality of operation target areas (step ST3a).

For example, when the first operation is executed on the operation target area in which the first operation mode is set out of the plurality of operation target areas, the control unit 12A executes processing of scrolling the operation target area. The control unit 12A does not execute processing corresponding to selection of an object even when the second operation is executed on the operation target area.

Alternatively, in an operation target area in which the second operation mode is set out of the plurality of operation target areas, the control unit 12A does not execute processing of scrolling the operation target area even when the first operation is executed on the operation target area. The control unit 12A executes processing corresponding to selection of an object when the second operation is executed on the operation target area.

If the operation is the third operation (step ST2a: third operation), the control unit 12A switches the operation mode of the operation target area in which the third operation is executed (step ST4a).

For example, the control unit 12A switches and updates the operation mode in area information of the operation target area in which the third operation is executed out of the area information stored in the area information storing unit 13A.

As a result, if the first operation mode is set to the operation target area, the operation mode is switched to the second operation mode, and if the second operation mode is set, the operation mode is switched to the first operation mode.

Then, the flow proceeds to processing in step ST3a, and the processing is executed.

Next, GUI screens in the second embodiment will be described with specific examples.

Figure 8A:
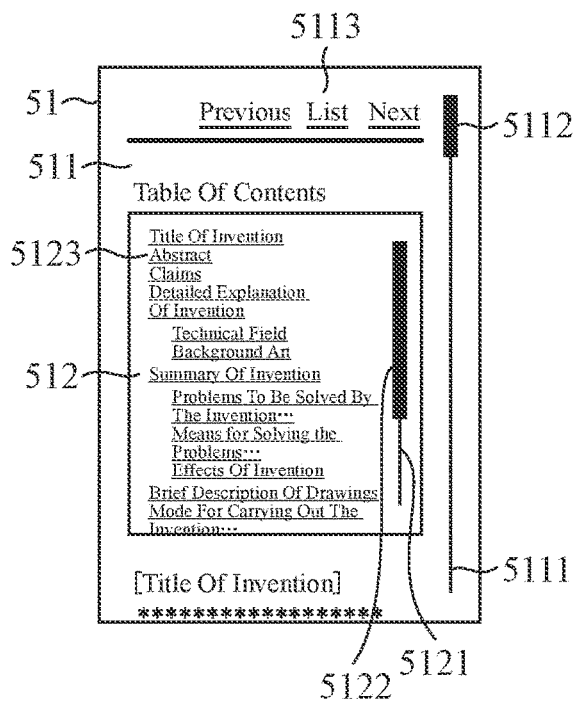
FIG. 8A is a diagram illustrating a first example of a GUI screen according to the second embodiment.
Figure 8B:
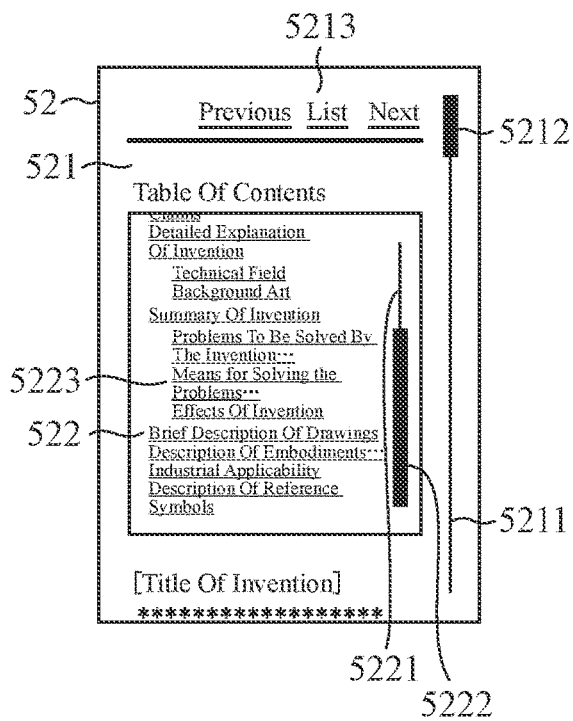
FIG. 8B is a diagram illustrating a second example of a GUI screen according to the second embodiment.
Figure 8C:
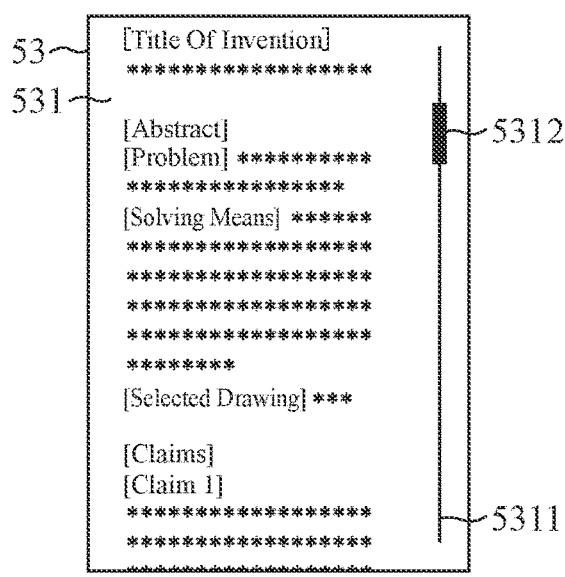
FIG. 8C is a diagram illustrating a third example of a GUI screen according to the second embodiment.
Figure 8D:
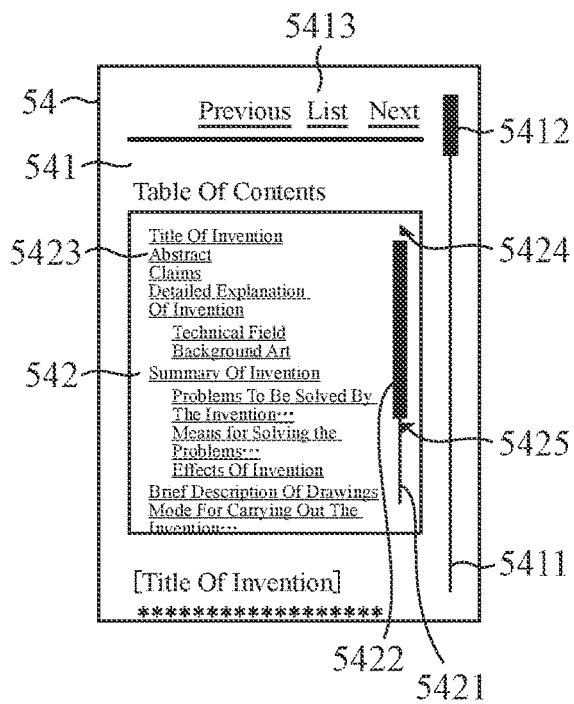
FIG. 8D is a diagram illustrating a fourth example of a GUI screen according to the second embodiment.
Figure 9A:
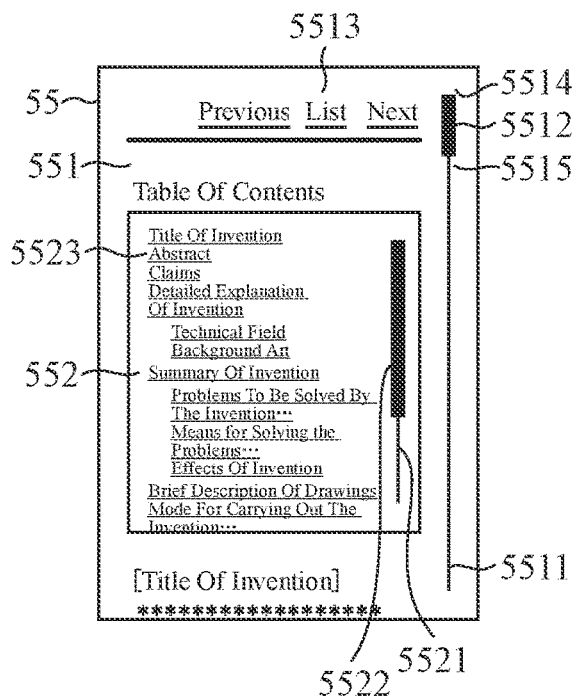
FIG. 9A is a diagram illustrating a fifth example of a GUI screen according to the second embodiment.
Figure 9B:
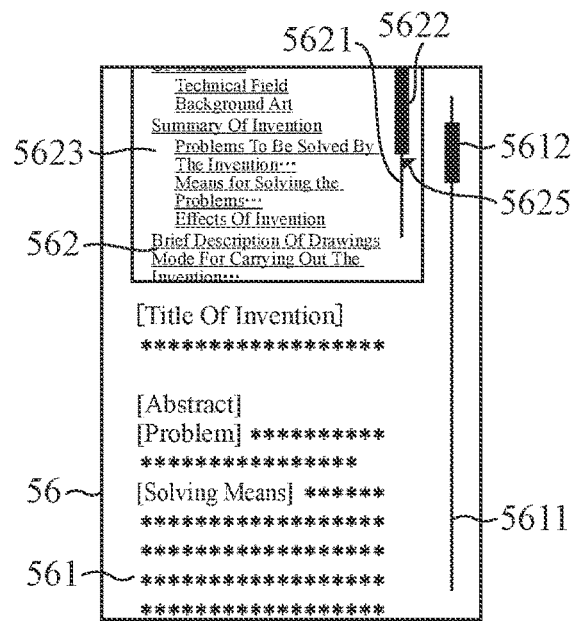
FIG. 9B is a diagram illustrating a sixth example of a GUI screen according to the second embodiment.
Figure 9C:
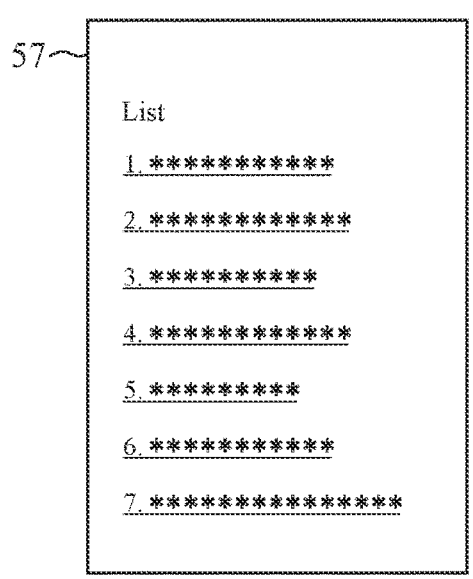
FIG. 9C is a diagram illustrating a seventh example of a GUI screen according to the second embodiment.
Figure 9D:
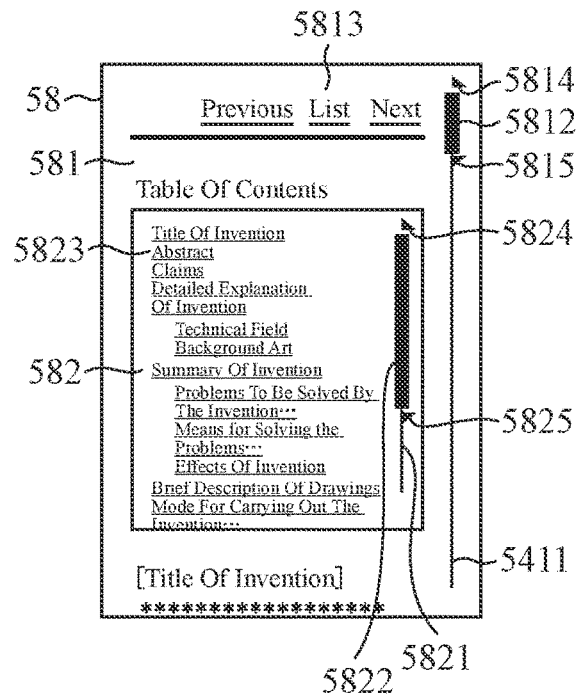
FIG. 9D is a diagram illustrating an eighth example of a GUI screen according to the second embodiment.

FIGS. 8A to 8D and FIGS. 9A to 9D illustrate specific examples of GUI screens in the second embodiment. FIG. 8A is a diagram illustrating a GUI screen 51. FIG. 8B is a diagram illustrating a GUI screen 52. FIG. 8C is a diagram illustrating a GUI screen 53. FIG. 8D is a diagram illustrating a GUI screen 54. FIG. 9A is a diagram illustrating a GUI screen 55. FIG. 9B is a diagram illustrating a GUI screen 56. FIG. 9C is a diagram illustrating a GUI screen 57. FIG. 9D is a diagram illustrating a GUI screen 58.

An area 511 illustrated in FIG. 8A, an area 521 illustrated in FIG. 8B, an area 531 illustrated in FIG. 8C, an area 541 illustrated in FIG. 8D, an area 551 illustrated in FIG. 9A, an area 561 illustrated in FIG. 9B, and an area 581 illustrated in FIG. 9D are operation target areas that can be scrolled only in the vertical direction.

An area 512 illustrated in FIG. 8A, an area 522 illustrated in FIG. 8B, an area 542 illustrated in FIG. 8D, an area 552 illustrated in FIG. 9A, an area 562 illustrated in FIG. 9B, and an area 582 illustrated in FIG. 9D are operation target areas that can be scrolled only in the vertical direction.

The area 512 is arranged inside the area 511. That is, the area 511 is an outer area, and the area 512 is an inner area. The area 522 (inner area) is arranged inside the area 521 (outer area). The area 542 (inner area) is arranged inside the area 541 (outer area). The area 552 (inner area) is arranged inside the area 551 (outer area). The area 562 (inner area) is arranged inside the area 561 (outer area). The area 582 (inner area) is arranged inside the area 581 (outer area).

In the area 511, the area 512, the area 521, the area 522, the area 531, the area 541, the area 552 and the area 561, the first operation mode in which operation corresponding to scroll processing is enabled and operation corresponding to selection of an object is disabled is set.

In the area 542, the area 551, the area 562, the area 581 and the area 582, the second operation mode in which operation corresponding to scroll processing is disabled and operation corresponding to selection of an object is enabled is set.

Bars 5111 and 5121 illustrated in FIG. 8A, bars 5211 and 5221 illustrated in FIG. 8B, a bar 5311 illustrated in FIG. 8C, bars 5411 and 5421 illustrated in FIG. 8D, bars 5511 and 5521 illustrated in FIG. 9A, bars 5611 and 5621 illustrated in FIG. 9B, and bars 5811 and 5821 illustrated in FIG. 9D indicate that the areas 511 and 512, the areas 521 and 522, the area 531, the areas 541 and 542, the areas 551 and 552, the areas 561 and 562, and the areas 581 and 582, respectively, can be scrolled only in the vertical direction. The length of each of these bars corresponds to the amount of information viewable in each of the areas including the bar.

Bars 5112 and 5122 illustrated in FIG. 8A, bars 5212 and 5222 illustrated in FIG. 8B, a bar 5312 illustrated in FIG. 8C, bars 5412 and 5422 illustrated in FIG. 8D, bars 5512 and 5522 illustrated in FIG. 9A, bars 5612 and 5622 illustrated in FIG. 9B, and bars 5812 and 5822 illustrated in FIG. 9D indicate the position in the vertical direction in the information currently displayed on the screen in the information that can be viewed in the areas 511 and 512, the areas 521 and 522, the area 531, the areas 541 and 542, the areas 551 and 552, the areas 561 and 562, and the areas 581 and 582, respectively.

The lengths of these bars correspond to the amount of information currently displayed on the screen.

Texts 5113 and 5123 illustrated in FIG. 8A, texts 5213 and 5223 illustrated in FIG. 8B, texts 5413 and 5423 illustrated in FIG. 8D, texts 5513 and 5523 illustrated in FIG. 9A, a text 5623 illustrated in FIG. 9B, and texts 5813 and 5823 illustrated in FIG. 9D are text items each set with a hyperlink. These text items are objects that can be selected by tap operation.

Marks 5424 and 5425 illustrated in FIG. 8D, marks 5514 and 5515 illustrated in FIG. 9A, a mark 5625 illustrated in FIG. 9B, marks 5814 and 5815 and marks 5824 and 5825 illustrated in FIG. 9D are images indicating that the second operation mode in which scroll processing is disabled is set to the areas 542, 551, 562, 581, and 582. An operator can recognize from these marks that the above areas cannot be scrolled.

In this manner, an operation target area is displayed on the screen in a display mode specified for each operation mode.

This allows the operator to recognize the operation mode from the display mode of the operation target area.

In FIGS. 8A to 8D and FIGS. 9A to 9D, a direction oriented upward in the drawings along a linear line forming an angle of less than 45 degrees with respect to a scrollable direction in the areas 511, 512, 521, 522, 531, 541, 542, 551, 552, 561, 562, 581, and 582 is defined as an upward direction, and a direction oriented downward in the drawings along the linear line is defined as a downward direction.

Furthermore, a direction oriented leftward in the drawings along a linear line forming an angle of equal to or greater than 45 degrees with respect to the scrollable direction in these areas is defined as a leftward direction, and a direction oriented rightward in the drawings along the linear line is defined as a rightward direction.

Note that when the upward direction or the downward direction is rephrased as the vertical direction and the leftward direction or the rightward direction is rephrased as the horizontal direction, the operator can perform flick operation or slide operation in the vertical direction and the horizontal direction in each of the plurality of areas mentioned above.

Next, operation on the GUI screens will be described.

The case where operation determined by the operation determination unit 11A in the GUI screen 51 is tap operation (second operation) of the text 5113 in the area 511 or the text 5123 in the area 512 is taken as an example. In this case, since the first operation mode is set in both the area 511 and the area 512, the control unit 12A does not execute processing corresponding to selection of the text 5113 or the text 5123. As a result, the display on the GUI screen 51 remains unchanged.

In the case where operation determined by the operation determination unit 11A is upward flick operation or slide operation (first operation) in the area 512, since the first operation mode is set in the area 512, the control unit 12A executes scrolling of the area 512. Under the control by the display processing unit 10A, the display device 103 displays the GUI screen 52 which is the result of scrolling the area 512.

In the case where operation determined by the operation determination unit 11A is upward flick operation or slide operation (first operation) in the area 511, since the first operation mode is set in the area 511, the control unit 12A executes scrolling of the area 511. Under the control by the display processing unit 10A, the display device 103 displays a GUI screen 53 which is the result of scrolling the area 511.

In the case where operation determined by the operation determination unit 11A in the area 512 is slide operation (third operation) in the horizontal direction, the control unit 12A switches the operation mode of the area 512 to the second operation mode. The display device 103 displays the marks 5424 and 5425 indicating that scrolling cannot be executed under the control by the display processing unit 10A instructed by the control unit 12A. As a result, the GUI screen 54 is displayed on the screen.

Meanwhile, in the case where operation determined by the operation determination unit 11A in the area 511 is slide operation (third operation) in the horizontal direction, the control unit 12A switches the operation mode of the area 511 to the second operation mode. The display device 103 displays the marks 5514 and 5515 indicating that scrolling cannot be executed under the control by the display processing unit 10A instructed by the control unit 12A. As a result, the GUI screen 55 is displayed on the screen.

In the GUI screen 52, a case where operation determined by the operation determination unit 11A is the tap operation (second operation) of the text 5213 in the area 521 or the text 5223 in the area 522 is taken as an example. In this case, since the first operation mode is set in both the area 521 and the area 522, the control unit 12A does not execute processing corresponding to selection of the text 5213 or the text 5223. As a result, the display on the GUI screen 52 remains unchanged.

In the case where operation determined by the operation determination unit 11A is downward flick operation or slide operation (first operation) in the area 522, since the first operation mode is set in the area 522, the control unit 12A executes scrolling of the area 522.

Under the control by the display processing unit 10A, the display device 103 displays the GUI screen 51 which is the result of scrolling the area 522.

In the case where operation determined by the operation determination unit 11A is upward flick operation or slide operation (first operation) in the area 521, since the first operation mode is set in the area 521, the control unit 12A executes scrolling of the area 521.

Under the control by the display processing unit 10A, the display device 103 displays a GUI screen which is the result of scrolling the area 521. This GUI screen is not illustrated.

Meanwhile, in the case where operation determined by the operation determination unit 11A in the area 522 is slide operation (third operation) in the horizontal direction, the control unit 12A switches the operation mode of the area 522 to the second operation mode. The display device 103 displays the marks 5424 and 5425 indicating that scrolling cannot be executed under the control by the display processing unit 10A instructed by the control unit 12A. This GUI screen is not illustrated.

In the case where operation determined by the operation determination unit 11A in the area 521 is slide operation (third operation) in the horizontal direction, the control unit 12A switches the operation mode of the area 521 to the second operation mode. The display device 103 displays the marks 5514 and 5515 indicating that scrolling cannot be executed under the control by the display processing unit 10A instructed by the control unit 12A. This GUI screen is not illustrated.

In the case where operation determined by the operation determination unit 11A in the GUI screen 53 is downward flick operation or slide operation (first operation) in the area 531, since the first operation mode is set in the area 531, the control unit 12A executes scrolling of the area 531.

Under the control by the display processing unit 10A, the display device 103 displays the GUI screen 51 which is the result of scrolling the area 531.

In the case where operation determined by the operation determination unit 11A in the area 531 is slide operation (third operation) in the horizontal direction, the control unit 12A switches the operation mode of the area 531 to the second operation mode. The display device 103 displays the marks 5514 and 5515 indicating that scrolling cannot be executed under the control by the display processing unit 10A instructed by the control unit 12A. This GUI screen is not illustrated.

In the GUI screen 54, a case where operation determined by the operation determination unit 11A is tap operation (second operation) of the text 5423 in the area 542 is taken as an example.

In this case, since the first operation mode is set in the area 541 though the second operation mode is set in the area 542, the control unit 12A does not execute processing corresponding to selection of the text 5423. As a result, the display on the GUI screen 54 remains unchanged.

Meanwhile, in the case where operation determined by the operation determination unit 11A is tap operation (second operation) of the text 5413 in the area 541, since the first operation mode is set in the area 541, the control unit 12A does not execute processing corresponding to the selection of the text 5413. As a result, the display on the GUI screen 54 remains unchanged.

In the case where operation determined by the operation determination unit 11A is upward flick operation or slide operation (first operation) in the area 542, since the first operation mode is set in the area 541 although the second operation mode is set in the area 542, the control unit 12A executes scrolling of the area 541. Under the control by the display processing unit 10A, the display device 103 displays the GUI screen 56 which is the result of scrolling the area 541.

In the case where operation determined by the operation determination unit 11A is upward flick operation or slide operation (first operation) in the area 541, since the first operation mode is set in the area 541, the control unit 12A executes scrolling of the area 541. Under the control by the display processing unit 10A, the display device 103 displays the GUI screen 56 which is the result of scrolling the area 541.

In the case where operation determined by the operation determination unit 11A in the area 542 is slide operation (third operation) in the horizontal direction, the control unit 12A switches the operation mode of the area 542 to the first operation mode. Under the control by the display processing unit 10A instructed by the control unit 12A, the display device 103 hides the marks 5424 and 5425, and the GUI screen 51 is displayed on the screen.

In the case where operation determined by the operation determination unit 11A in the area 541 is slide operation (third operation) in the horizontal direction, the control unit 12A switches the operation mode of the area 541 to the second operation mode. The display device 103 displays the marks 5814 and 5815 under the control by the display processing unit 10A instructed by the control unit 12A, and the GUI screen 58 is displayed on the screen.

In the GUI screen 55, in the case where operation determined by the operation determination unit 11A is tap operation (second operation) of the text 5523 in the area 552, since the first operation mode is set in the area 552, the control unit 12A does not execute processing corresponding to the selection of the text 5523. As a result, the display on the GUI screen 55 remains unchanged.

In the case where operation determined by the operation determination unit 11A is tap operation (second operation) of the text 5513 in the area 551, since the second operation mode is set in the area 551, the control unit 12A executes processing corresponding to the selection of the text 5513. The display device 103 displays the GUI screen 57 corresponding to the selection of the text 5513 under the control by the display processing unit 10A.

In the case where operation determined by the operation determination unit 11A is upward flick operation or slide operation (first operation) in the area 552, since the first operation mode is set in the area 552, the control unit 12A executes scrolling of the area 552. Under the control by the display processing unit 10A, the display device 103 displays a GUI screen which is the result of scrolling the area 552. This GUI screen is not illustrated.

In the case where operation determined by the operation determination unit 11A is upward flick operation or slide operation (first operation) in the area 551, since the second operation mode is set in the area 551, the control unit 12A does not execute scrolling of the area 551. As a result, the display on the GUI screen 55 remains unchanged.

Meanwhile, in the case where operation determined by the operation determination unit 11A in the area 552 is slide operation (third operation) in the horizontal direction, the control unit 12A switches the operation mode of the area 552 to the second operation mode. The display device 103 displays marks 5824 and 5825 indicating that scrolling cannot be executed under the control by the display processing unit 10A instructed by the control unit 12A. As a result, the GUI screen 58 is displayed on the screen.

In the case where operation determined by the operation determination unit 11A in the area 551 is slide operation (third operation) in the horizontal direction, the control unit 12A switches the operation mode of the area 551 to the first operation mode. The display device 103 hides the marks 5514 and 5515 indicating that scrolling cannot be executed under the control by the display processing unit 10A instructed by the control unit 12A. As a result, the GUI screen 51 is displayed on the screen.

In the GUI screen 56, in the case where operation determined by the operation determination unit 11A is tap operation (second operation) of the text 5623 in the area 562, since the first operation mode is set in the area 561 though the second operation mode is set in the area 562, the control unit 12A does not execute processing corresponding to the selection of the text 5623. As a result, the display on the GUI screen 56 remains unchanged.

In the case where operation determined by the operation determination unit 11A is downward flick operation or slide operation (first operation) in the area 562, since the first operation mode is set in the area 561 though the second operation mode is set in the area 562, the control unit 12A executes scrolling of the area 561.

Under the control by the display processing unit 10A, the display device 103 displays the GUI screen 54 which is the result of scrolling the area 561.

In the case where operation determined by the operation determination unit 11A is downward flick operation or slide operation (first operation) in the area 561, since the first operation mode is set in the area 561, the control unit 12A executes scrolling of the area 561.

Under the control by the display processing unit 10A, the display device 103 displays the GUI screen 54 which is the result of scrolling the area 561.

Meanwhile, in the case where operation determined by the operation determination unit 11A in the area 562 is slide operation (third operation) in the horizontal direction, the control unit 12A switches the operation mode of the area 562 to the first operation mode. The display device 103 hides the mark 5625 indicating that scrolling cannot be executed under the control by the display processing unit 10A instructed by the control unit 12A. This GUI screen is not illustrated.

In the case where operation determined by the operation determination unit 11A in the area 561 is slide operation (third operation) in the horizontal direction, the control unit 12A switches the operation mode of the area 561 to the second operation mode. The display device 103 displays the marks 5814 and 5815 indicating that scrolling cannot be executed under the control by the display processing unit 10A instructed by the control unit 12A. This GUI screen is not illustrated.

In the GUI screen 58, in the case where operation determined by the operation determination unit 11A is tap operation (second operation) of the text 5823 in the area 582, since the second operation mode is set in both of the areas 581 and 582, the control unit 12A executes processing corresponding to the selection of the text 5823. The display device 103 displays the GUI screen 53 corresponding to the selection of the text 5823 under the control by the display processing unit 10A.

In the case where operation determined by the operation determination unit 11A is tap operation (second operation) of the text 5813 in the area 581, since the second operation mode is set in the area 581, the control unit 12A executes processing corresponding to the selection of the text 5813. The display device 103 displays the GUI screen 57 corresponding to the selection of the text 5813 under the control by the display processing unit 10A.

In the case where operation determined by the operation determination unit 11A is upward flick operation or slide operation (first operation) in the area 581 or the area 582, since the second operation mode is set in the area 581 and the area 582, the control unit 12A does not execute scrolling of the area 581 or the area 582. As a result, the display on the GUI screen 58 remains unchanged.

In the case where operation determined by the operation determination unit 11A in the area 582 is slide operation (third operation) in the horizontal direction, the control unit 12A switches the operation mode of the area 582 to the first operation mode. The display device 103 hides the marks 5824 and 5825 indicating that scrolling cannot be executed under the control by the display processing unit 10A instructed by the control unit 12A. As a result, the GUI screen 55 is displayed.

In the case where operation determined by the operation determination unit 11A in the area 581 is slide operation (third operation) in the horizontal direction, the control unit 12A switches the operation mode of the area 581 to the first operation mode. The display device 103 hides the marks 5814 and 5815 indicating that scrolling cannot be executed under the control by the display processing unit 10A instructed by the control unit 12A. As a result, the GUI screen 54 is displayed.

Next, details of the operation will be described.

Figure 10:
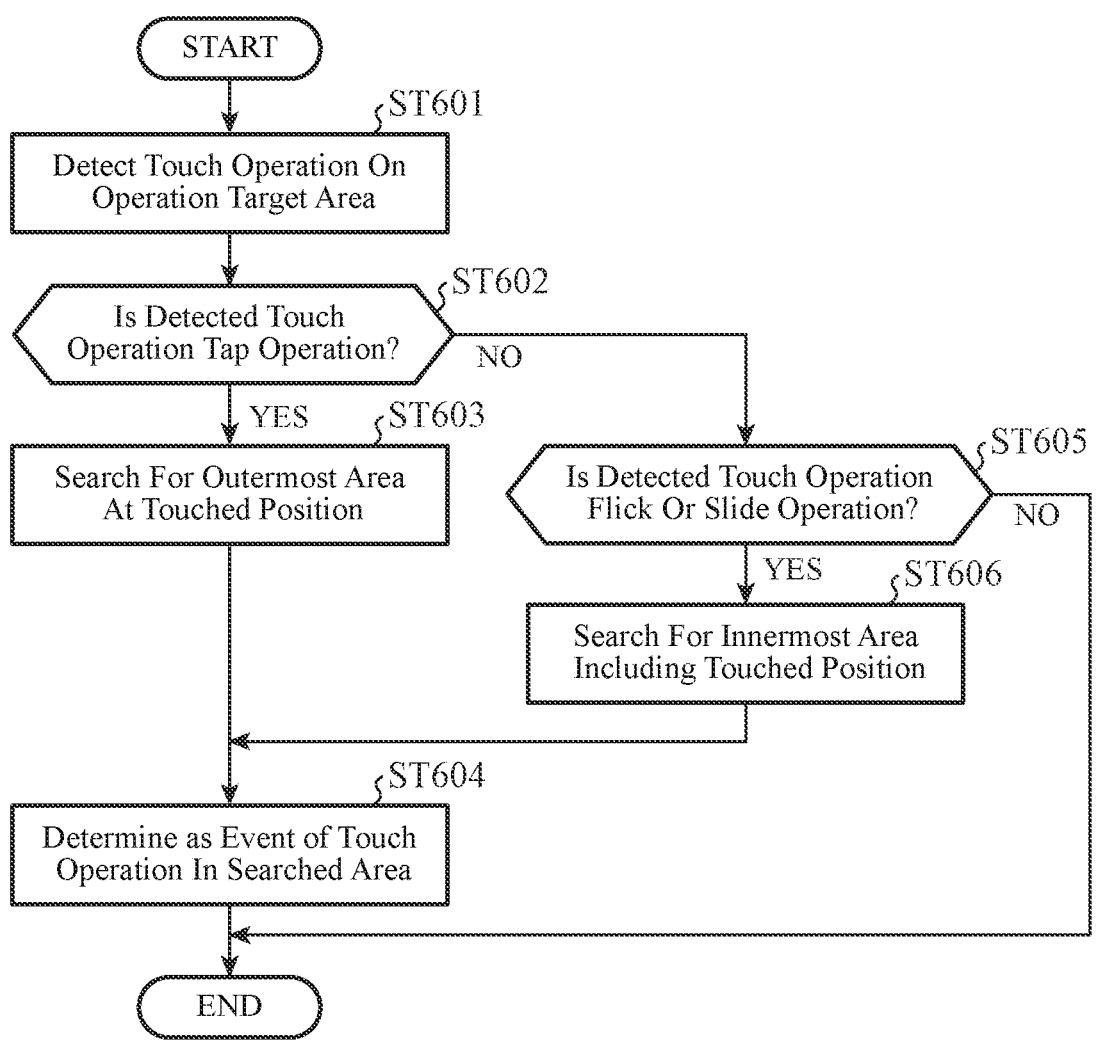
FIG. 10 is a flowchart illustrating discrimination processing of touch operation according to the second embodiment.
Figure 11:
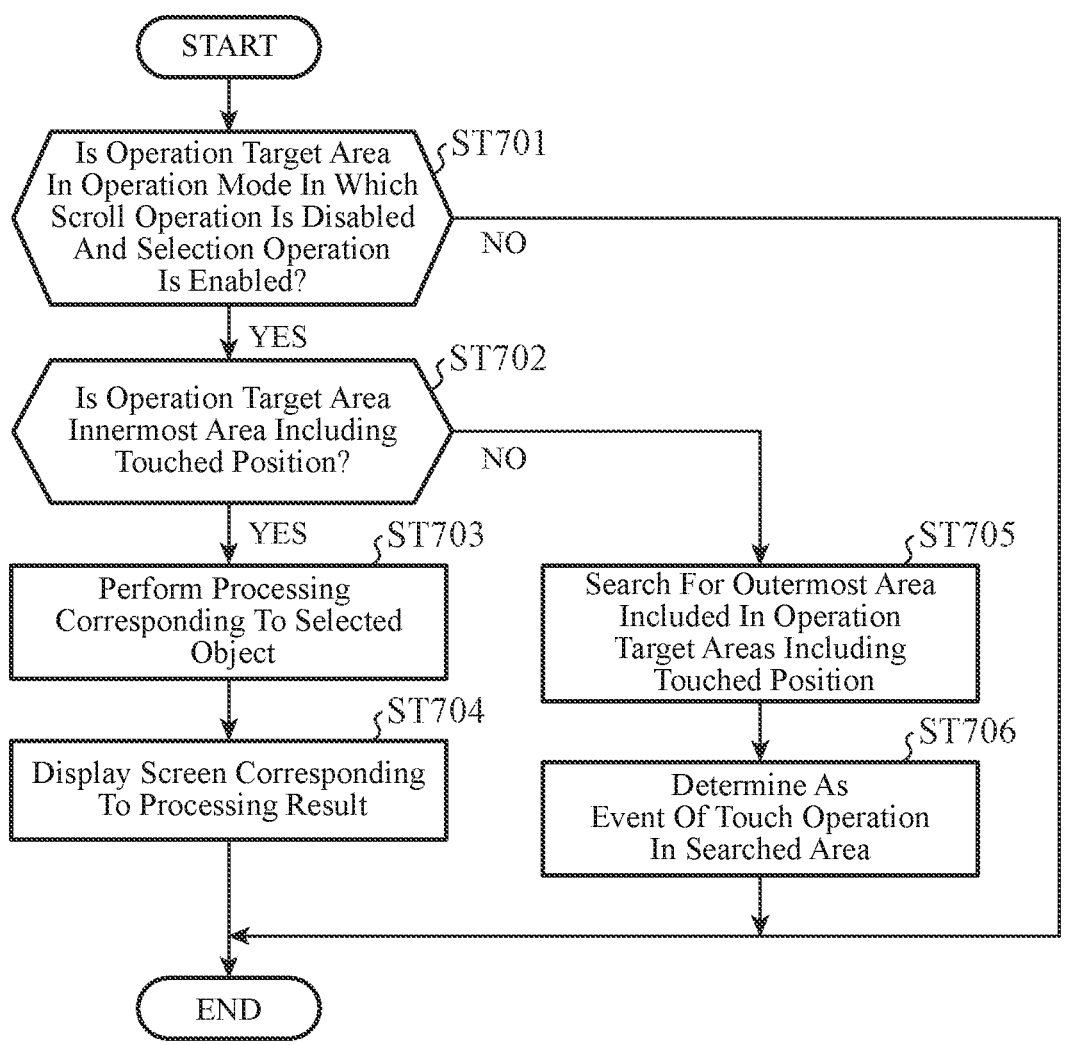
FIG. 11 is a flowchart illustrating processing when an event of tap operation occurs.
Figure 12:
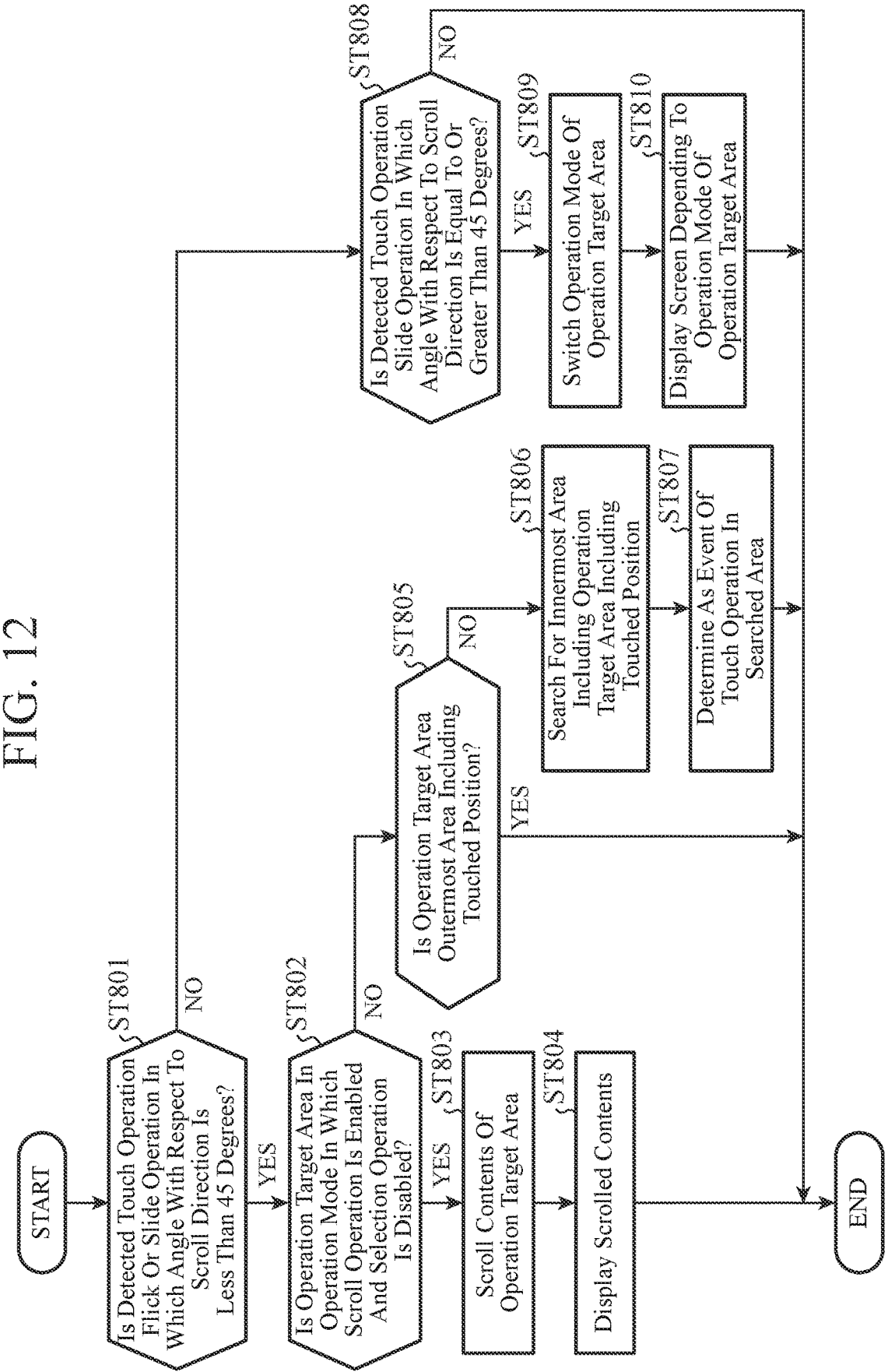
FIG. 12 is a flowchart illustrating processing when an event of flick operation or slide operation occurs.

FIG. 10 is a flowchart illustrating processing for discriminating touch operation according to the second embodiment, which illustrates a series of processing from detection of touch operation by the touch panel to occurrence of an event of touch operation. FIG. 11 is a flowchart illustrating processing when an event of tap operation occurs, which is executed for each operation target area. FIG. 12 is a flowchart illustrating processing when an event of flick operation or slide operation occurs, which is executed for each operation target area.

First, as a first example, a case where the text 5823 in the area 582 displayed on the GUI screen 58 is tapped will be described.

Upon detecting touch operation on an operation target area, the input control unit 100 outputs event information of the touch operation to the operation determination unit 11A. The operation determination unit 11A recognizes that touch operation has been detected by receiving the event information of the touch operation.

When touch operation on the operation target area is detected (step ST601), the operation determination unit 11A determines whether the detected touch operation is tap operation (step ST602). In this example, the text 5823 is tapped (step ST602; YES).

The operation determination unit 11A searches for the outermost area from the touched position in the plurality of operation target areas (areas 581 and 582) on the GUI screen 58 (step ST603). Here, since the area 582 is touched, the area 581 is searched as the operation target area on the outermost position from the touched position.

The operation determination unit 11A sends, to the control unit 12A, that event information of the touch operation is that of an event of touch operation of the searched area 581 (step ST604).

Upon receiving the event of the touch operation in the area 581, the control unit 12A confirms whether the operation mode of the area 581 is the second operation mode (step ST701).

Since the second operation mode is set in the area 581 (step ST701; YES), the operation determination unit 11A confirms whether the area 581 is the innermost operation target area in the operation target areas including the touched position (step ST702).

Since the area 581 is not the innermost area (step ST702; NO), the operation determination unit 11A searches for the outermost operation target area out of operation target areas included in the operation target area (area 581) including the touched position (step ST705).

On the GUI screen 58, the area 582 is searched as the operation target area that matches the above search conditions out of the operation target areas included in the area 581.

The operation determination unit 11A sends, to the control unit 12A, that the touch operation on the area 582 is an event of touch operation of the searched area 582 (step ST706).

Upon receiving the event of the touch operation of the area 582 from the operation determination unit 11A, the control unit 12A proceeds to step ST701.

Since the second operation mode is set in the area 582, the operation determination unit 11A confirms whether the area 582 is the innermost operation target area in the operation target areas including the touched position (step ST702).

Since the area 582 is the innermost operation target area in the operation target areas including the touched position (step ST702; YES), the control unit 12A executes processing corresponding to selection of the text 5823 (step ST703).

Under the control by the display processing unit 10A, the display device 103 displays a GUI screen corresponding to selection of the text 5823 (step ST704). In this manner, a series of processing completes.

Next, as a second example, a case where the text 5113 in the area 511 displayed on the GUI screen 51 is tapped will be described.

When touch operation on an operation target area is detected by the touch panel (step ST601), the operation determination unit 11A determines whether the detected touch operation is tap operation (step ST602). In this example, the text 5113 is tapped (step ST602; YES).

The operation determination unit 11A searches for the outermost operation target area from the touched position in the plurality of operation target areas (areas 511 and 512) (step ST603).

In this example, the area 511 is searched as the outermost operation target area from the touched position.

The operation determination unit 11A sends, to the control unit 12A, that event information of the touch operation is that of an event of touch operation of the searched area 511 (step ST604).

Upon receiving the event of the touch operation in the area 511, the control unit 12A confirms whether the operation mode of the area 511 is the second operation mode (step ST701).

Since the first operation mode is set in the area 511 (step ST701; NO), the control unit 12A terminates the processing without any further action.

As a third example, a case where upward flick operation is executed in the area 512 displayed on the GUI screen 51 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

Next, the operation determination unit 11A determines whether the detected touch operation is flick operation or slide operation (step ST605). It is determined that upward flick operation is executed in the area 512 (step ST605; YES).

In step ST606, the operation determination unit 11A searches for the innermost operation target area including the touched position. In the GUI screen 51, the area 512 is searched as the innermost operation target area including the touched position.

The operation determination unit 11A determines that event information of the touch operation is that of an event of touch operation of the searched area 512 (step ST604).

The operation determination unit 11A determines whether the touch operation determined as the event in the area 512 is flick operation or slide operation in which the angle formed by the operation direction with respect to a scrollable direction in the area 512 is less than 45 degrees (step ST801).

Since the touch operation is upward flick operation in the area 512, it is determined as flick operation that satisfies the above conditions (step ST801; YES).

The control unit 12A confirms whether the operation mode of the area 512 where the flick operation has been executed is the first operation mode (step ST802).

Since the first operation mode is set in the area 512 (step ST802; YES), the control unit 12A executes scroll processing of the area 512 (step ST803).

Under the control by the display processing unit 10A, the display device 103 displays a GUI screen obtained by scrolling the area 512 (step ST804). In this manner, a series of processing completes.

As a fourth example, the case where upward flick operation is executed in the area 542 displayed on the GUI screen 54 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

Next, the operation determination unit 11A determines whether the detected touch operation is flick operation or slide operation (step ST605). It is determined that upward flick operation is executed in the area 542 (step ST605; YES).

The operation determination unit 11A searches for the innermost operation target area including the touched position (step ST606). Here, the area 542 is searched as the innermost operation target area including the touched position.

The operation determination unit 11A determines that event information of the touch operation is that of an event of touch operation of the searched area 542 (step ST604).

The operation determination unit 11A determines whether the touch operation determined as the event in the area 542 is flick operation or slide operation in which the angle formed by the operation direction with respect to a scrollable direction in the area 542 is less than 45 degrees (step ST801).

Since the touch operation is upward flick operation in the area 542, it is determined as flick operation that satisfies the above conditions (step ST801; YES).

The control unit 12A confirms whether the operation mode of the area 542 where the flick operation has been executed is the first operation mode (step ST802).

Since the second operation mode is set in the area 542 (step ST802; NO), the operation determination unit 11A determines whether the area 542 is the outermost operation target area including the touched position (step ST805).

Here, since the area 542 is not the outermost operation target area including the touched position (step ST805; NO), the operation determination unit 11A searches for the innermost operation target area including the operation target area including the touched position (step ST806).

Here, the operation target area including the touched position is the area 542 in which it is determined that the event of touch operation has occurred in step ST604.

On the GUI screen 54, out of operation target areas including the area 542, the area 541 is searched as the operation target area that matches the above search conditions.

The operation determination unit 11A determines that event information of the touch operation is that of an event of touch operation of the searched area 541 (step ST807).

Thereafter, the operation determination unit 11A determines whether the touch operation determined as the event in the area 541 is flick operation or slide operation in which the angle formed by the operation direction with respect to a scrollable direction in the area 541 is less than 45 degrees (step ST801).

Since the touch operation is upward flick operation in the area 541, it is determined as flick operation that satisfies the above conditions (step ST801; YES).

The control unit 12A confirms whether the operation mode of the area 541 where the flick operation has been executed is the first operation mode (step ST802).

Since the first operation mode is set in the area 541 (step ST802; YES), the control unit 12A executes scroll processing of the area 541 (step ST803).

Under the control by the display processing unit 10A, the display device 103 displays a GUI screen obtained by scrolling the area 541 (step ST804). In this manner, a series of processing completes.

As a fifth example, a case where upward flick operation is executed in the area 551 displayed on the GUI screen 55 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

Next, the operation determination unit 11A determines whether the detected touch operation is flick operation or slide operation (step ST605). It is determined that upward flick operation is executed in the area 551 (step ST605; YES).

The operation determination unit 11A searches for the innermost operation target area including the touched position (step ST606). Here, the area 551 is searched as the innermost operation target area including the touched position.

The operation determination unit 11A determines that event information of the touch operation is that of an event of touch operation of the searched area 551 (step ST604).

The operation determination unit 11A determines whether the touch operation determined as the event in the area 551 is flick operation or slide operation in which the angle formed by the operation direction with respect to a scrollable direction in the area 551 is less than 45 degrees (step ST801).

Since the touch operation is upward flick operation in the area 551, it is determined as flick operation that satisfies the above conditions (step ST801; YES).

The control unit 12A confirms whether the operation mode of the area 551 where the flick operation has been executed is the first operation mode (step ST802).

Since the second operation mode is set in the area 551 (step ST802; NO), the operation determination unit 11A determines whether the area 551 is the outermost operation target area including the touched position (step ST805).

Since the area 551 is the outermost operation target area including the touched position (step ST805; YES), the control unit 12A terminates the processing without any further action.

As a sixth example, a case where rightward slide operation is executed in the area 512 displayed on the GUI screen 51 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

Next, the operation determination unit 11A determines whether the detected touch operation is flick operation or slide operation (step ST605). It is determined that rightward slide operation is executed in the area 512 (step ST605; YES).

The operation determination unit 11A searches for the innermost operation target area including the touched position (step ST606). Here, the area 512 is searched as the innermost operation target area including the touched position.

The operation determination unit 11A determines that event information of the touch operation is that of an event of touch operation of the searched area 512 (step ST604).

The operation determination unit 11A determines whether the touch operation determined as the event in the area 512 is flick operation or slide operation in which the angle formed by the operation direction with respect to a scrollable direction in the area 512 is less than 45 degrees (step ST801).

Since the touch operation is rightward slide operation in the area 512, it is determined as the slide operation that does not satisfy the above conditions (step ST801; NO).

Next, the operation determination unit 11A determines whether the touch operation determined as an event in the area 512 is slide operation in which the angle formed by the operation direction with respect to a scrollable direction in the area 512 is equal to or greater than 45 degrees (step ST808).

Since the touch operation is rightward slide operation in the area 512, it is determined as the slide operation that satisfies the above conditions (step ST808; YES).

If the slide operation executed in the area 512 satisfies the above conditions, the control unit 12A switches the operation mode of the area 512 (step ST809).

Since the first operation mode is set in the area 512, the control unit 12A switches the operation mode of the area 512 to the second operation mode.

The display device 103 displays a GUI screen indicating that scrolling cannot be executed under the control by the display processing unit 10A instructed by the control unit 12A (step ST810).

As a seventh example, a case where rightward flick operation is executed in the area 511 displayed on the GUI screen 51 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

The operation determination unit 11A determines whether the detected touch operation is flick operation or slide operation (step ST605). It is determined that rightward flick operation is executed in the area 511 (step ST605; YES).

The operation determination unit 11A searches for the innermost operation target area including the touched position (step ST606). Here, since there is no inner operation target area including the touched position, the area 511 is searched.

The operation determination unit 11A determines that event information of the touch operation is that of an event of touch operation of the searched area 511 (step ST604).

The operation determination unit 11A determines whether the touch operation determined as the event in the area 511 is flick operation or slide operation in which the angle formed by the operation direction with respect to a scrollable direction in the area 511 is less than 45 degrees (step ST801).

Since the touch operation is rightward flick operation in the area 511, it is determined as flick operation that does not satisfy the above conditions (step ST801; NO).

Next, the operation determination unit 11A determines whether the touch operation determined as an event in the area 511 is slide operation in which the angle formed by the operation direction with respect to a scrollable direction in the area 511 is equal to or greater than 45 degrees (step ST808). Since the touch operation is rightward flick operation in the area 511, it is determined as slide operation that does not satisfy the above conditions (step ST808; NO), and the processing is terminated.

As an eighth example, a case where pinch operation is executed on the area 511 displayed on the GUI screen 51 will be described.

When touch operation on an operation target area is detected by the touch panel (step ST601), the operation determination unit 11A determines whether the detected touch operation is tap operation (step ST602). Here, it is determined that the detected touch operation is not tap operation (step ST602; NO).

The operation determination unit 11A determines whether the detected touch operation is flick operation or slide operation (step ST605). Since pinch operation has been executed in the area 511 (step ST605; NO), the processing is terminated.

Although the case where the plurality of operation target areas include outer areas and inner areas has been described, a first operation target area and a second operation target area may be displayed on the screen in alignment.

In the case where, in the first operation target area in which the second operation mode is set, operation determined by the operation determination unit 11A is the first operation, the control unit 12A does not execute scrolling of the first operation target area in the case where the second operation mode is set in the second operation target area. At this time, in the case where the first operation mode is set in the second operation target area, the control unit 12A scrolls the second operation target area.

For example, when the second operation mode is set in the first operation target area with the intention of scrolling the second operation target area, even when the first operation is erroneously executed in the first operation target area, the second operation target area is scrolled. In other words, erroneous operation that the first operation is erroneously recognized as the second operation or that the second operation is erroneously recognized as the first operation can be suppressed.

As described above, in the GUI control device 1A according to the second embodiment, the display processing unit 10A displays a plurality of operation target areas on the screen. The operation determination unit 11A determines operation executed on each of the plurality of operation target areas. The control unit 12A sets one of the first operation mode and the second operation mode to each of the plurality of operation target areas and executes processing corresponding to the first operation or the second operation depending on the set operation mode. The control unit 12A switches, out of the plurality of operation target areas, the operation mode of an operation target area in which the operation determined by the operation determination unit 11A is the third operation.

The first operation is touch operation for scrolling the operation target area, and in particular, flick operation or slide operation in which the angle formed by an operation direction with respect to a scrollable direction in the operation target area is less than a threshold value. The second operation is touch operation for selecting an object in the operation target area. The third operation is different from the first operation and the second operation. The third operation is, for example, slide operation in which an angle formed by the operation direction with respect to a direction in which the operation target area can be scrolled is equal to or more than a threshold value.

Since the third operation allows the first operation and the second operation to be switched between enabled and disabled states, erroneous operation can be suppressed in which the first operation is erroneously recognized as the second operation, or the second operation is erroneously recognized as the first operation.

In the GUI control device 1A according to the second embodiment, the display processing unit 10A displays each of the plurality of operation target areas such that an inner area is arranged within an outer area on the screen.

In the case where operation determined by the operation determination unit 11A in the inner area in which the second operation mode is set is the second operation, the control unit 12A does not execute processing corresponding to selection of an object when the first operation mode is set in the outer area including the inner area. In this example, if the second operation mode is set in the outer area, the control unit 12A executes processing corresponding to the selection of an object. In the case where operation determined by the operation determination unit 11A is the first operation, the control unit 12A does not execute processing of scrolling the inner area when the second operation mode is set in the outer area including the inner area. In this example, if the first operation mode is set in the outer area, the control unit 12A executes processing of scrolling the outer area. This can enhance operability for performing the first operation on the outer area.

For example, in the GUI screen 51, in order to scroll the area 511, it is necessary to execute first operation (flick operation) on a portion of the area 511 that is not occupied by the area 512. In the case where flick operation is erroneously executed on the portion occupied by the area 512 when scrolling the area 511 is intended, in the conventional art, the area 512 is scrolled.

Contrary to this, in the GUI control device 1A according to the second embodiment, execution of the third operation on the area 512 to switch to the second operation mode avoids the area 512 from being scrolled even when flick operation is executed on the portion occupied by the area 512.

That is, regardless of which part of the area 512 is flicked, the area 511 can be scrolled. The above effect becomes remarkable as the area of an inner area within an outer area is larger since it becomes more difficult to flick the portion of the outer area that is not occupied by the inner area.

Third Embodiment

Figure 13:
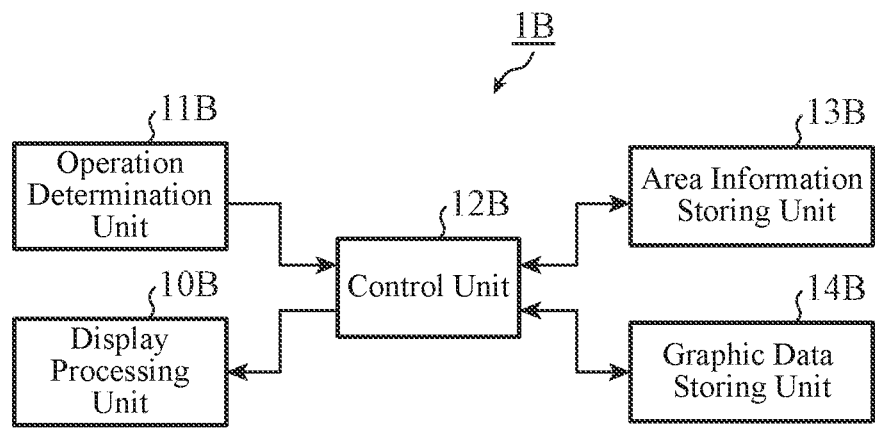
FIG. 13 is a block diagram illustrating a functional configuration of a GUI control device according to a third embodiment of the present invention.

FIG. 13 is a block diagram illustrating a functional configuration of a GUI control device 1B according to a third embodiment of the present invention. The GUI control device 1B is provided in an in-vehicle electronic device, for example, and controls the GUI between an operator and the in-vehicle electronic device.

The GUI control device 1B includes a display processing unit 10B, an operation determination unit 11B, a control unit 12B, an area information storing unit 13B, and a graphic data storing unit 14B.

The display processing unit 10B displays the image based on graphic data received from the control unit 12B on the screen of the display device 103 illustrated in FIGS. 2A and 2B.

For example, the display processing unit 10B displays an operation target area in which processing corresponding to the first operation and processing corresponding to the second operation can be executed and a mode-switching area corresponding thereto adjacent to each other on the screen. A mode-switching area is an area operated for switching the operation mode of the operation target area, and operation on this mode-switching area corresponds to the third operation.

Arranging these areas adjacent to each other facilitates execution of switching the operation mode.

The operation determination unit 11B determines operation executed on the operation target area and the mode-switching area. For example, the operation determination unit 11B determines operation executed on these operation target areas on the basis of input control signals corresponding to touch operation on each of the operation target area and the mode-switching area.

The control unit 12B sets one of the first operation mode and the second operation mode in the operation target area and executes processing corresponding to the first operation or the second operation depending on the operation mode.

In the case where the operation determined by the operation determination unit 11B is operation on the mode-switching area, the control unit 12B switches the operation mode of the operation target area corresponding to the mode-switching area.

The area information storing unit 13B stores area information related to operation target areas.

Information related to an operation target area includes operation mode of the operation target area.

The graphic data storing unit 14B stores graphic data of operation target areas and graphic data of mode-switching areas.

Graphic data of an operation target area also includes graphic data of an operation target area to be transitioned to upon selection of an object in the operation target area.

Graphic data of a mode-switching area may be in different display modes before and after execution of operation in the mode-switching area. This allows an operator to recognize an operation mode from the display mode of the mode-switching area.

The control unit 12B receives discrimination information of touch operation from the operation determination unit 11B, reads an operation mode of an operation target area from the area information storing unit 13B, and executes processing corresponding to operation executed on the operation target area depending on the operation mode.

When operation is executed on the mode-switching area, the control unit 12B switches and updates the operation mode in area information of the operation target area corresponding to this mode-switching area.

The control unit 12B requests graphic data corresponding to the executed operation to the graphic data storing unit 14B, reads the graphic data corresponding to the request, and sends the data to the display processing unit 10B. The display processing unit 10B displays the operation target area and the mode-switching area on the screen on the basis of the graphic data received from the control unit 12B.

In FIG. 13, the GUI control device 1B including the area information storing unit 13B and the graphic data storing unit 14B is illustrated; however, no limitation thereto is intended.

For example, as long as storage devices enable reading and updating of the area information as well as requesting and reading the graphic data by the control unit 12B, the storage devices may be provided separately from the GUI control device 1B.

That is, the area information storing unit 13B and the graphic data storing unit 14B are not indispensable components to the GUI control device 1B.

The functions of the display processing unit 10B, the operation determination unit 11B, the control unit 12B, the area information storing unit 13B, and the graphic data storing unit 14B in the GUI control device 1B are implemented by a processing circuit. That is, the GUI control device 1B includes processing circuit for executing these functions. The processing circuit may be dedicated hardware or a CPU that executes a program stored in a memory.

In the case where the processing circuit is the processing circuit 104 of dedicated hardware illustrated in FIG. 2A, the processing circuit 104 corresponds to, for example, a single circuit, a composite circuit, a programmed processor, a parallel programmed processor, an ASIC, an FPGA, or a combination thereof.

The functions of the display processing unit 10B, the operation determination unit 11B, the control unit 12B, the area information storing unit 13B, and the graphic data storing unit 14B in the GUI control device 1B may be implemented by separate processing circuits, or the respective functions may be implemented collectively by a single processing circuit.

In the case where the processing circuit is the CPU 105 illustrated in FIG. 2B, the functions of the display processing unit 10B, the operation determination unit 11B, the control unit 12B, the area information storing unit 13B, and the graphic data storing unit 14B are implemented by software, firmware, or a combination of software and firmware. Software and firmware are described as a program and stored in a memory 106. The memory 106 may include a RAM and a ROM. In this case, the RAM stores data generated by information processing such as screen data displayed on the display device 103 and control data necessary for execution of the program, and the ROM stores the program to be executed by the CPU 105.

The CPU 105 reads and executes the program stored in the memory 106 and thereby implements the respective functions. That is, the GUI control device 1B includes the memory for storing the program, upon executed by the processing circuit, which results in execution of processing from step ST1$b$ to step ST4$b$ illustrated in FIG. 14.

In addition, such programs cause a computer to execute the procedures or methods of the display processing unit 10B, the operation determination unit 11B, the control unit 12B, the area information storing unit 13B, and the graphic data storing unit 14B.

Some of the functions of the display processing unit 10B, the operation determination unit 11B, the control unit 12B, the area information storing unit 13B, and the graphic data storing unit 14B may be implemented by dedicated hardware and a rest thereof may be implemented by software or firmware.

For example, the area information storing unit 13B and the graphic data storing unit 14B implement functions thereof by a processing circuit of dedicated hardware, and functions of the display processing unit 10B, the operation determination unit 11B, and the control unit 12B are implemented by the CPU 105 executing the program stored in the memory 106.

In this manner, the processing circuit can implement the functions described above by hardware, software, firmware, or a combination thereof.

Figure 14:
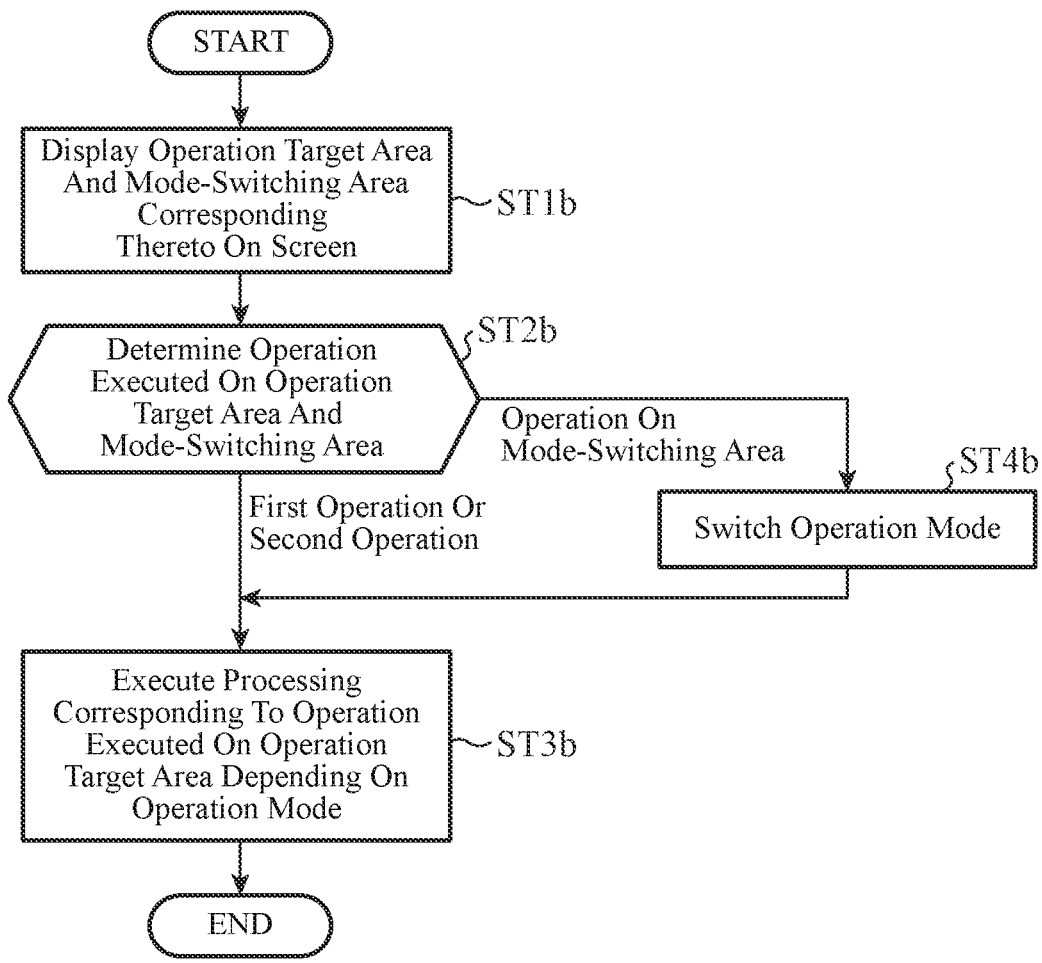
FIG. 14 is a flowchart illustrating an overview of the operation of the GUI control device according to the third embodiment.

FIG. 14 is a flowchart illustrating the outline of the operation of the GUI control device 1B, and illustrates a series of processing from the time when an operation target area is displayed on the screen to the time when processing corresponding to operation is executed.

First, the display processing unit 10B displays an operation target area and a mode-switching area on the screen of the display device 103 on the basis of graphic data received from the control unit 12B (step ST1$b$). Next, the operation determination unit 11B determines operation executed on the operation target area and the mode-switching area displayed on the screen (step ST2$b$).

If the operation is either the first operation or the second operation (step ST2$b$: first operation or second operation), the control unit 12B executes processing corresponding to the first operation or the second operation depending on the operation mode of the operation target area on which the operation is executed (step ST3$b$).

For example, when the first operation is executed on an operation target area in which the first operation mode is set, the control unit 12B executes processing of scrolling the operation target area. The control unit 12B does not execute processing corresponding to selection of an object even when the second operation is executed on the operation target area.

Moreover, in an operation target area in which the second operation mode is set, the control unit 12B does not execute processing of scrolling the operation target area even when the first operation is executed on the operation target area. On the other hand, the control unit 12B executes processing corresponding to selection of an object when the second operation is executed on the operation target area.

In the case where the operation is executed on the mode-switching area (step ST2$b$: operation on mode-switching area), the control unit 12B switches the operation mode of the operation target area corresponding to the mode-switching area (step ST4$b$).

For example, the control unit 12B switches and updates the operation mode in area information of the operation target area corresponding to the mode-switching area out of the area information stored in the area information storing unit 13B. As a result, if the first operation mode is set to the operation target area, the operation mode is switched to the second operation mode, and if the second operation mode is set, the operation mode is switched to the first operation mode. Thereafter, the flow proceeds to processing in step ST3$b$, and the processing is executed.

Next, GUI screens in the third embodiment will be described with specific examples.

FIGS. 15A to 15D are diagrams illustrating specific examples of a GUI screen according to the third embodiment.

Figure 15A:
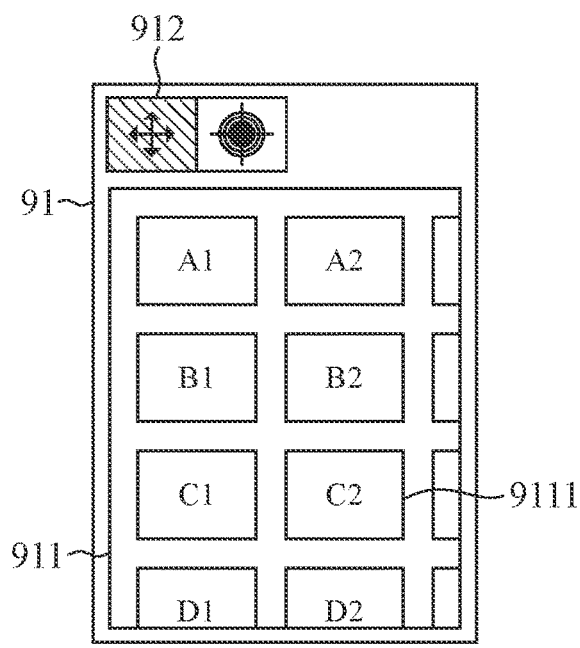
FIG. 15A is a diagram illustrating a first example of a GUI screen according to the third embodiment.
Figure 15B:
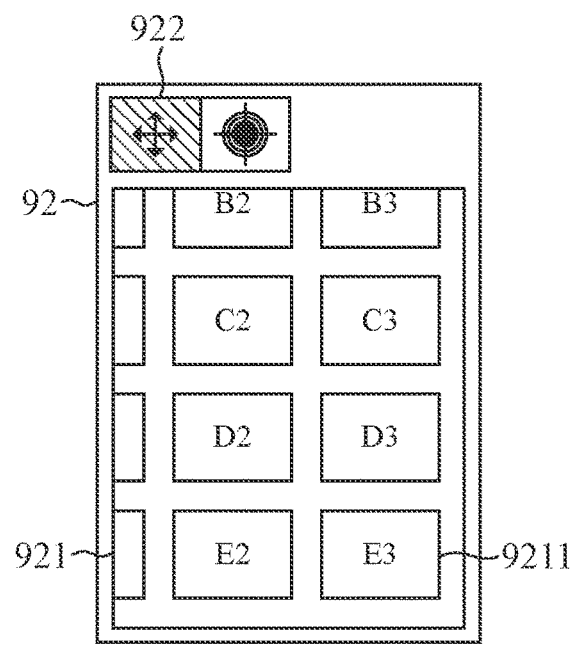
FIG. 15B is a diagram illustrating a second example of a GUI screen according to the third embodiment.
Figure 15C:
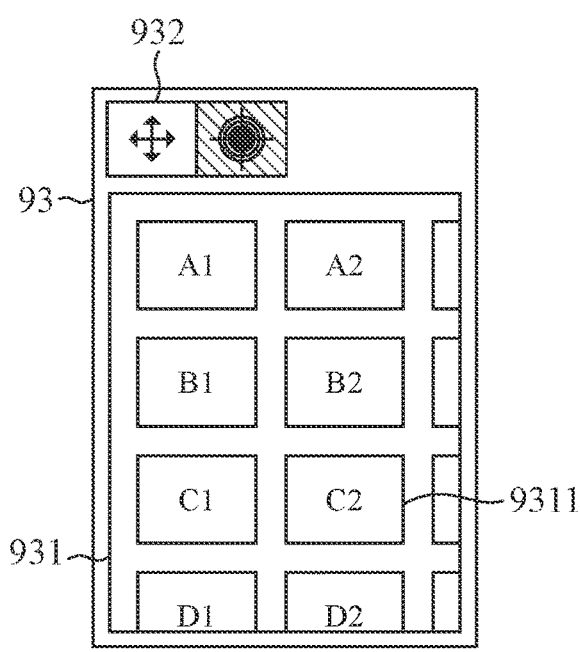
FIG. 15C is a diagram illustrating a third example of a GUI screen according to the third embodiment.
Figure 15D:
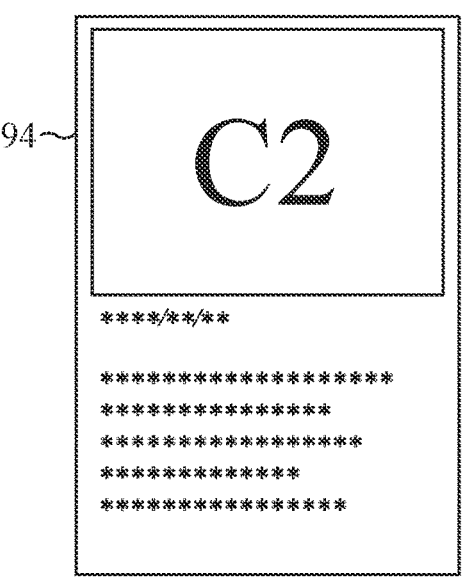
FIG. 15D is a diagram illustrating a fourth example of a GUI screen according to the third embodiment.

FIG. 15A is a diagram illustrating a GUI screen 91. FIG. 15B is a diagram illustrating the GUI screen 92. FIG. 15C is a diagram illustrating the GUI screen 93. FIG. 15D is a diagram illustrating the GUI screen 94.

An area 911 illustrated in FIG. 15A, an area 921 illustrated in FIG. 15B, and an area 931 illustrated in FIG. 15C are operation target areas which can be scrolled in any direction.

In the area 911 and the area 921, the first operation mode in which operation corresponding to scroll processing is enabled and operation corresponding to selection of an object is disabled is set.

In the area 931, the second operation mode in which operation corresponding to scroll processing is disabled and operation corresponding to selection of an object is enabled is set.

An area 912 illustrated in FIG. 15A, an area 922 illustrated in FIG. 15B, and an area 932 illustrated in FIG. 15C are mode-switching areas corresponding to the areas 911, 921, and 931, respectively.

In the areas 912 and 922, marks on the left side, in which an arrow is drawn to indicate whether scroll operation is enabled, are selected, which indicates that the areas 911 and 921 corresponding thereto are in the first operation mode. Moreover in the area 932, a mark on the right side, in which a circle is drawn to indicate whether selecting operation on an object is enabled, which indicates that the area 931 corresponding to the area 932 is in the second operation mode.

An object 9111 illustrated in FIG. 15A, an object 9211 illustrated in FIG. 15B, and an object 9311 illustrated in FIG. 15C are images selectable by tap operation.

An operator can execute flick operation or slide operation on the areas 911, 921, and 931.

The operator can perform tap operation, rightward flick operation or slide operation on the area 912 and the area 922.

The operator can execute tap operation, leftward flick operation or slide operation on the area 932.

Next, operation on the GUI screens will be described.

In the GUI screen 91, in the case where operation determined by the operation determination unit 11B in the area 911 is tap operation on the object 9111, since the first operation mode is set in the area 911, the control unit 12B does not execute processing corresponding to selection of the object 9111. In this case, the display on the GUI screen 91 remains unchanged.

When flick operation or slide operation in the upper left direction on the area 911 is determined by the operation determination unit 11B, since the first operation mode is set in the area 911, the control unit 12B executes scrolling of the area 911. Under the control by the display processing unit 10B, the display device 103 displays the GUI screen 92 which is the result of scrolling the area 911.

When tap operation or rightward flick operation or slide operation on the area 912 is determined by the operation determination unit 11B, the control unit 12B switches the area 911 to the second operation mode. The display device 103 changes the display of the area 912 to that of the area 932 under control by the display processing unit 10B instructed by the control unit 12B. As a result, the GUI screen 93 is displayed.

In the GUI screen 92, in the case where operation determined by the operation determination unit 11B in the area 921 is tap operation on the object 9211, since the first operation mode is set in the area 921, the control unit 12B does not execute processing corresponding to selection of the object 9211. As a result, the display on the GUI screen 92 remains unchanged.

When flick operation or slide operation in the lower right direction on the area 921 is determined by the operation determination unit 11B, since the first operation mode is set in the area 921, the control unit 12B executes scrolling of the area 921. Under the control by the display processing unit 10B, the display device 103 displays the GUI screen 91 which is the result of scrolling the area 921.

When tap operation or rightward flick operation or slide operation on the area 922 is determined by the operation determination unit 11B, the control unit 12B switches the area 921 to the second operation mode. The display device 103 changes the display of the area 922 to that of the area 932 under control by the display processing unit 10B instructed by the control unit 12B. A resulting GUI screen is not illustrated.

In the GUI screen 93, in the case where operation determined by the operation determination unit 11B in the area 931 is tap operation on the object 9311, since the second operation mode is set in the area 931, the control unit 12B executes processing corresponding to selection of the object 9311.

The display device 103 displays the GUI screen 94 corresponding to the selection of the object 9311 under control by the display processing unit 10B.

When flick operation or slide operation in the upper left direction on the area 931 is determined by the operation determination unit 11B, since the second operation mode is set in the area 931, the control unit 12B does not execute scrolling of the area 931. The display on the GUI screen 93 remains unchanged.

When tap operation or leftward flick operation or slide operation on the area 932 is determined by the operation determination unit 11B, the control unit 12B switches the area 931 to the first operation mode. The display device 103 displays the GUI screen 91 obtained by changing the display of the area 932 to that of the area 912 under control by the display processing unit 10B instructed by the control unit 12B.

Next, details of the operation will be described.

Figure 16:
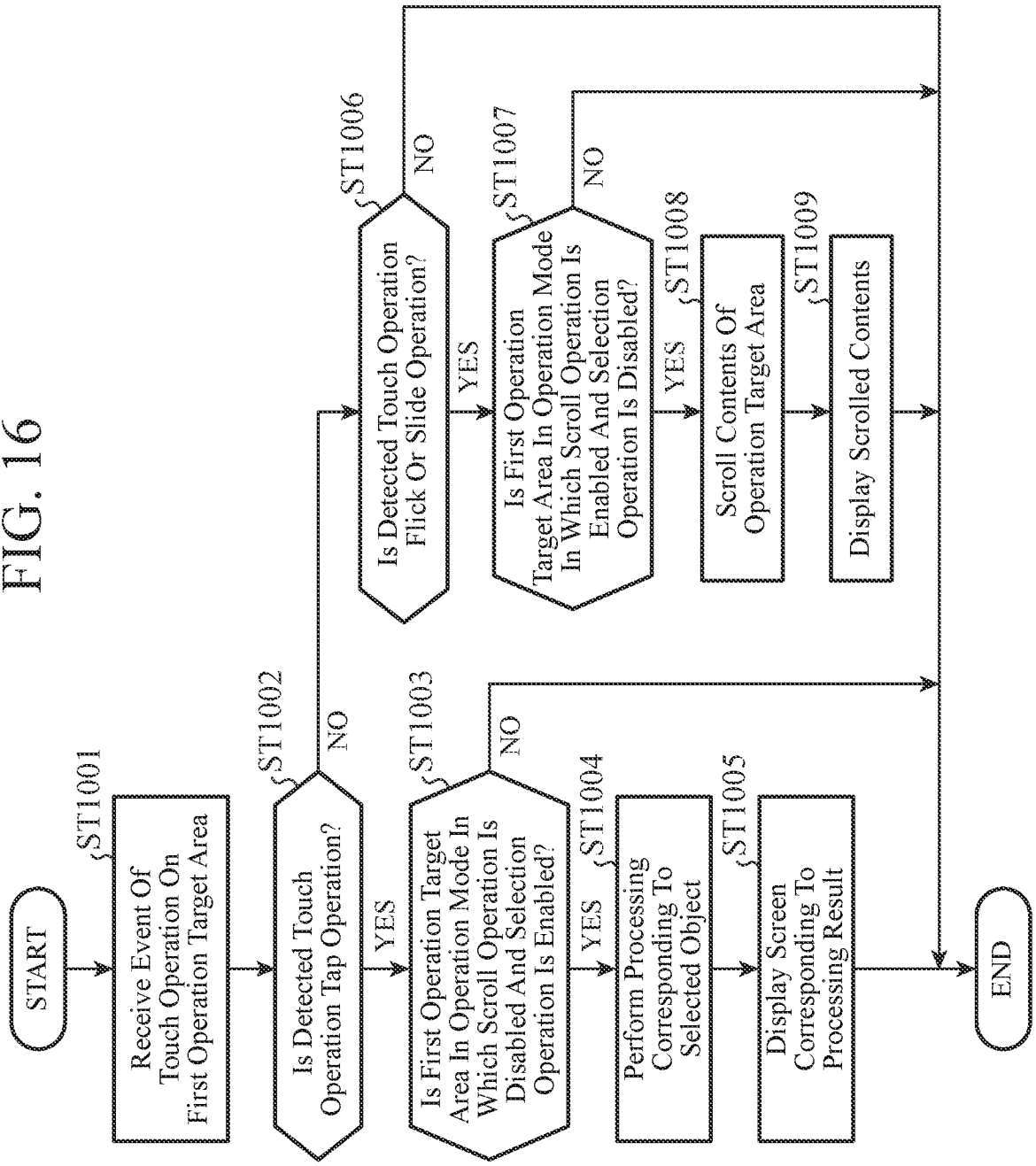
FIG. 16 is a flowchart illustrating processing corresponding to operation on an operation target area in the third embodiment.

FIG. 16 is a flowchart illustrating processing corresponding to operation on an operation target area.

A first operation target area illustrated in FIG. 16 is an operation target area in which processing corresponding to the first operation and processing corresponding to the second operation can be executed.

Upon detection of touch operation on an operation target area, the input control unit 100 outputs event information of the touch operation to the operation determination unit 11B. The operation determination unit 11B recognizes that touch operation has been detected by receiving the event information of the touch operation.

Upon receiving an event of touch operation on the first operation target area (step ST1001), the operation determination unit 11B determines whether the detected touch operation is tap operation (step ST1002).

If the touch operation executed on the first operation target area is tap operation (step ST1002; YES), the control unit 12B confirms whether the second operation mode is set in the first operation target area (step ST1003).

If the second operation mode is set in the first operation target area (step ST1003; YES), the control unit 12B executes processing corresponding to selection of an object by the tap operation (step ST1004). Under control by the display processing unit 10B, the display device 103 displays a GUI screen corresponding to the selection of an object (step ST1005).

If the second operation mode is not set in the first operation target area (step ST1003; NO), the processing is terminated.

On the other hand, if the touch operation executed on the first operation target area is not tap operation (step ST1002; NO), the operation determination unit 11B determines whether the detected touch operation is flick operation or slide operation (step ST1006).

If the detected touch operation is flick operation or slide operation (step ST1006; YES), the control unit 12B confirms whether the first operation mode is set in the first operation target area (step ST1007).

If the first operation mode is set in the first operation target area (step ST1007; YES), the control unit 12B scrolls the first operation target area depending on the flick operation or the slide operation (step ST1008).

Under control by the display processing unit 10B, the display device 103 displays a screen obtained by scrolling the first operation target area (step ST1009).

If the touch operation executed on the first operation target area is not flick operation nor slide operation (step ST1006; NO), or if the second operation mode is set in the first operation target area (step ST1007; NO), the control unit 12B does not respond to the touch operation and terminates the processing.

FIG. 17 is a flowchart illustrating processing corresponding to operation on the mode-switching area corresponding to the operation target area in FIG. 16. A second operation target area illustrated in FIG. 17 is the mode-switching area corresponding to the first operation target area.

Upon receiving an event of touch operation on the second operation target area (step ST1101), the control unit 12B confirms whether the first operation mode is set in the first operation target area (step ST1102).

If the first operation mode is set in the first operation target area (step ST1102; YES), the operation determination unit 11B determines whether the detected touch operation is tap operation or rightward flick operation or slide operation (step ST1103).

If the detected touch operation is tap operation or rightward flick operation or slide operation (step ST1103; YES), the control unit 12B switches the operation mode of the first operation target area to the second operation mode (step ST1104).

Under control by the display processing unit 10B, the display device 103 displays a screen corresponding to the second operation mode set in the first operation target area (step ST1105).

For example, an image indicating that scrolling is disabled is displayed.

If the detected touch operation is not tap operation nor rightward flick operation or slide operation (step ST1103; NO), the processing is terminated.

If the first operation mode is not set in the first operation target area (step ST1102; NO), the operation determination unit 11B determines whether the detected touch operation is tap operation or leftward flick operation or slide operation (step ST1106).

If the detected touch operation is tap operation or leftward flick operation or slide operation (step ST1106; YES), the control unit 12B switches the operation mode of the first operation target area to the first operation mode (step ST1104).

Under control by the display processing unit 10B, the display device 103 displays a screen corresponding to the first operation mode set in the first operation target area (step ST1105).

For example, an image indicating that selection of an object is disabled is displayed.

If the detected touch operation is not tap operation nor leftward flick operation or slide operation (step ST1106; NO), the processing is terminated.

Note that, in the case where operation determined by the operation determination unit 11B in the first operation target area in which the second operation mode is set is the second operation, the control unit 12B may execute processing corresponding to selection of an object and may further switch the operation target area to the first operation mode.

Normally, when an operator selects an object to display a new operation target area on the screen, the operator views information of this operation target area. In this case, when scroll processing of the operation target area is disabled, it is difficult to view the information.

Therefore, by causing the control unit 12B to execute processing corresponding to selection of an object and then to switch the operation target area to the first operation mode, a newly displayed operation target area becomes scrollable, thereby facilitating viewing of the information.

As described above, in the GUI control device 1B according to the third embodiment, the display processing unit 10B displays an operation target area and a mode-switching area corresponding thereto on the screen. The operation determination unit 11B determines operation on the operation target area and operation executed on the mode-switching area. In the case where the operation determined by the operation determination unit 11B is operation on the mode-switching area, the control unit 12B switches the operation mode of the operation target area.

Since processing corresponding to the first operation and processing corresponding to the second operation can be switched between being enabled and disabled by operation on the mode-switching area, erroneous operation can be suppressed in which the first operation is erroneously recognized as the second operation, or the second operation erroneously recognized as the first operation.

For example in the GUI screen 91 illustrated in FIG. 15A, even when the object 9111 is erroneously tapped when flick operation is attempted with an intention to scroll, processing corresponding to the tap operation is disabled in the area 911. As a result, the tap operation is not accepted, and no erroneous operation occurs.

Incidentally, within the scope of the present invention, the present invention may include a flexible combination of the respective embodiments, a modification of any component of the respective embodiments, or omission of any component in the respective embodiments.

INDUSTRIAL APPLICABILITY

A GUI control device according to the present invention is capable of suppressing erroneous operation and thus is suitable for, for example, a GUI control device in an in-vehicle electronic device.

REFERENCE SIGNS LIST

1, 1A, 1B: GUI control device, 10, 10A, 10B: Display processing unit, 11, 11A, 11B: Operation determination unit, 12, 12A, 12B: Control unit, 13, 13A, 13B: Area information storing unit, 14, 14A, 14B: Graphic data storing unit, 31 to 34, 51 to 58, 91 to 94: GUI screen, 100: Input control unit, 101: Input device, 102: Output control unit, 103: Display device, 104: Processing circuit, 105: CPU, 106: Memory, 311, 321, 331, 341, 511, 512, 521, 522, 531, 541, 542, 551, 552, 561, 562, 581, 582, 911, 912, 921, 922, 931, 932: Area, 3111, 3112, 3211, 3212, 3311, 3312, 3411, 3412, 5111, 5112, 5121, 5122, 5211, 5212, 5221, 5222, 5311, 5312, 5411, 5412, 5421, 5422, 5511, 5512, 5521, 5522, 5611, 5612, 5621, 5622, 5811, 5812, 5821, 5822: Bar, 3113, 3313, 3413, 5113, 5123, 5213, 5223, 5413, 5423, 5513, 5523, 5623, 5813, 5823: Text, 3314, 3315, 5424, 5425, 5514, 5515, 5625, 5814, 5815, 5824, 5825: Mark, 9111, 9211, 9311: Object

The invention claimed is:

1. A graphical user interface control device comprising:
a processor;
a memory storing instructions, upon executed by the processor, causing the processor perform a process of:
displaying, on a screen, an operation target area in which processing corresponding to first operation and processing corresponding to second operation which is different from the first operation can be executed;
determining operation executed on the operation target area; and
setting one of a first operation mode, in which the first operation is enabled and the second operation is disabled, and a second operation mode, in which the first operation is disabled and the second operation is enabled, to the operation target area and executing processing corresponding to the first operation or the second operation depending on the set operation mode,
wherein in the case where the operation determined by the process is third operation which is different from any of the first operation and the second operation, the process switches the operation mode of the operation target area.

2. The graphical user interface control device according to claim 1,
wherein the first operation is touch operation for scrolling the operation target area, and
the second operation is touch operation for selecting an object in the operation target area.

3. The graphical user interface control device according to claim 2,
wherein, in the operation target area in which the first operation mode is set, in a case where the operation determined by the process is the first operation, the process executes processing of scrolling the operation target area, and in a case where the operation determined by the process is the second operation, the process does not execute processing corresponding to selection of the object, and
in the operation target area in which the second operation mode is set, in a case where the operation determined by the process is the first operation, the process does not execute processing of scrolling the operation target area, and in a case where the operation determined by the process is the second operation, the process executes processing corresponding to selection of the object.

4. The graphical user interface control device according to claim 2,
wherein, in a case where the operation determined by the process in the operation target area, in which the second operation mode is set, is the second operation, the process executes processing corresponding to selection of the object and further switches the operation target area to the first operation mode.

5. The graphical user interface control device according to claim 2,
wherein the first operation is flick operation or slide operation in which an angle formed by an operation direction with respect to a scrollable direction in the operation target area is less than a threshold value, and
the third operation is slide operation in which an angle formed by an operation direction with respect to a scrollable direction in the operation target area is equal to or greater than the threshold value.

6. The graphical user interface control device according to claim 1,
wherein the process displays, on the screen, a plurality of operation target areas in which processing corresponding to the first operation and processing corresponding to the second operation can be executed,
the process determines operation executed on each of the plurality of operation target areas, and
the process sets one of the first operation mode and the second operation mode to each of the plurality of operation target areas, executes processing corresponding to the first operation or the second operation depending on the set operation mode, and switches an operation mode of an operation target area in which the operation determined by the process is the third operation out of the plurality of operation target areas.

7. The graphical user interface control device according to claim 6,
wherein the first operation is touch operation for scrolling the operation target area, and
the second operation is touch operation for selecting an object in the operation target area.

8. The graphical user interface control device according to claim 7,
wherein the process displays each of the plurality of operation target areas on the screen in alignment,
in the operation target area in which the first operation mode is set out of the plurality of operation target areas, in a case where the operation determined by the process is the first operation, the process executes processing of scrolling the operation target area, and in a case where the operation determined by the process is the second operation, the process does not execute processing corresponding to selection of the object, and
in the operation target area in which the second operation mode is set out of the plurality of operation target areas, in a case where the operation determined by the process is the first operation, the process does not execute processing of scrolling the operation target area, and in a case where the operation determined by the process is the second operation, the process executes processing corresponding to selection of the object.

9. The graphical user interface control device according to claim 8,
wherein the process displays a first operation target area and a second operation target area on the screen in alignment, and
in the first operation target area in which the second operation mode is set, in a case where the operation determined by the process is the first operation and the second operation mode is set in the second operation target area, the process does not execute processing of scrolling the first operation target area, and in a case where the first operation mode is set in the second operation target area, the process executes processing of scrolling the second operation target area.

10. The graphical user interface control device according to claim 7,
wherein the process displays each of the plurality of operation target areas on the screen such that an inner area is arranged within an outer area, in the inner area in which the second operation mode is set, in a case where the operation determined by the process is the second operation and the first operation mode is set in the outer area including the inner area, the process does not execute processing corresponding to selection of the object, and in a case where the second operation mode is set in the outer area, the process executes processing corresponding to selection of the object, and in the inner area in which the second operation mode is set, in a case where the operation determined by the process is the first operation and the second operation mode is set in the outer area including the inner area, the process does not execute processing of scrolling the inner area, and in a case where the first operation mode is set in the outer area, the process executes processing of scrolling the outer area.

11. The graphical user interface control device according to claim 1, wherein the process displays, on the screen, an operation target area in which processing corresponding to the first operation and processing corresponding to the second operation can be executed and a mode-switching area corresponding to the operation target area, the process determines operation on the operation target area and operation executed on the mode-switching area, and the process switches the operation mode of the operation target area in a case where the operation determined by the process is operation on the mode-switching area.

12. The graphical user interface control device according to claim 11, wherein the first operation is touch operation for scrolling the operation target area, and the second operation is touch operation for selecting an object in the operation target area.

13. The graphical user interface control device according to claim 12, wherein, in a case where the operation determined by the process in the operation target area, in which the second operation mode is set, is the second operation, the process executes processing corresponding to selection of the object and further switches the operation target area to the first operation mode.

14. The graphical user interface control device according to claim 12, wherein the first operation is flick operation or slide operation, the second operation is tap operation, and the operation on the mode-switching area is any one of flick operation, slide operation, and tap operation.

15. The graphical user interface control device according to claim 11, wherein the process displays the operation target area and the mode-switching area corresponding thereto on the screen adjacent to each other.

16. The graphical user interface control device according to claim 1, wherein the process displays the operation target area on the screen in a display mode specified for each of the operation modes.

17. A method for controlling graphical user interface, the method comprising:

displaying, on a screen, an operation target area in which processing corresponding to first operation and processing corresponding to second operation which is different from the first operation can be executed;

determining operation executed on the operation target area;

setting one of a first operation mode, in which the first operation is enabled and the second operation is disabled, and a second operation mode, in which the first operation is disabled and the second operation is enabled, to the operation target area and executing processing corresponding to the first operation or the second operation depending on the set operation mode; and switching the operation mode of the operation target area in a case where the operation determined by the determining step is third operation which is different from any of the first operation and the second operation.

* * * * *